June 11, 1963 D. R. ANDREWS 3,093,334

MAGNETIC RECORDING AND REPRODUCING APPARATUS

Filed April 27, 1959 9 Sheets-Sheet 1

INVENTOR.
DALLAS R. ANDREWS
BY Morris L. Rabkin
ATTORNEY

MAGNETIC RECORDING AND REPRODUCING APPARATUS

INVENTOR.
DALLAS R. ANDREWS
BY Morris A. Rabkin
ATTORNEY

June 11, 1963 D. R. ANDREWS 3,093,334

MAGNETIC RECORDING AND REPRODUCING APPARATUS

Filed April 27, 1959 9 Sheets-Sheet 3

INVENTOR.
DALLAS R. ANDREWS
BY Morris A. Rabkin
ATTORNEY

INVENTOR.
DALLAS R. ANDREWS
BY Morris A. Lahtin
ATTORNEY

MAGNETIC RECORDING AND REPRODUCING APPARATUS

INVENTOR.
DALLAS R. ANDREWS
BY Morris A. Rabkin
ATTORNEY

June 11, 1963 D. R. ANDREWS 3,093,334

MAGNETIC RECORDING AND REPRODUCING APPARATUS

Filed April 27, 1959 9 Sheets-Sheet 6

INVENTOR.
DALLAS R. ANDREWS
BY
Morris Rabkin
ATTORNEY

INVENTOR.
DALLAS R. ANDREWS
BY Morris A. Rabkin
ATTORNEY

INVENTOR.
DALLAS R. ANDREWS
BY Morris Rabkin
ATTORNEY

June 11, 1963 D. R. ANDREWS 3,093,334

MAGNETIC RECORDING AND REPRODUCING APPARATUS

Filed April 27, 1959 9 Sheets-Sheet 9

INVENTOR.
DALLAS R. ANDREWS
BY Morris A. Rabkin
ATTORNEY

United States Patent Office 3,093,334 Patented June 11, 1963

3,093,334

MAGNETIC RECORDING AND REPRODUCING APPARATUS

Dallas R. Andrews, Merchantville, N.J., assignor to Radio Corporation of America, a corporation of Delaware Filed Apr. 27, 1959, Ser. No. 809,192
27 Claims. (Cl. 242—55.12)

The present invention relates to magnetic recording and reproducing apparatus, and more particularly to a mechanism for handling magnetic tape records carried in cartridges.

With the advent of the magnetic tape cartridge, a low-cost and easily operated mechanism for using tape carrying cartridges has become necessary. Such mechanism must be capable of performing all of the functions desired during magnetic recording and reproducing operations. Thus, the mechanism must be simply controlled to provide for tape reeling at slow speed during playback and recording operations, as well as fast reeling in either the forward or the reverse directions for rapid rewinding and to permit rapid location of a desired selection recorded on the tape. Since the magnetic tape record is confined within a tape cartridge, it is imperative that the tape record be stopped before the end of the tape is reached during any of the reeling operations. If the tape is completely run off the hub or reel, the cartridge must be disassembled to rethread the tape. Such disassembly and rethreading would eliminate the major feature of the tape cartridge apparatus which is convenience of operation in that the tape record in the cartridge does not require threading through the guides and across the transducers, as in the case of conventional magnetic recording and reproducing apparatus.

While several methods and means for stopping the reeling operations before the end of the tape is reached have been suggested, these methods and means are not entirely satisfactory from the point of view of ease of construction and manufacture cost, particularly when it is desired to mass produce magnetic recording and reproducing mechanisms. It will be appreciated that the tape record is moving at a considerable speed during fast reeling operations. The reel or hub around which the tape is wound is also rotated at high speed. The problem of stopping the tape before the end thereof is reached is therefore complicated by the necessity of simultaneously stopping several rotating members which develop high inertia, including the heavily loaded reel of tape, all without breaking the tape. Devices which have been developed in the past for solving this problem have often involved complex expensive braking arrangements providing degenerative braking. Such devices are unsuitable, because of their cost and operational difficulties, in the mechanism intended to be mass produced and used by the ordinary untrained person.

Since it is necessary that a magnetic recording and reproducing apparatus of the type provided by the present invention be operated by untrained persons, a simplified control system is necessary. Such a control system must be capable of selecting any desired reeling function and be foolproof so that it will be impossible to damage the mechanism or break the tape by improper or untimely operation of a control. It has been found that pushbutton controls are most suitable for use by untrained persons who operate magnetic recording and reproducing apparatus and that these persons prefer pushbutton controls. Several types of pushbutton control mechanisms for magnetic recording and reproducing apparatus have already been suggested. Such mechanisms, however, cannot satisfactorily be incorporated in a magnetic recording and reproducing apparatus for handling tape cartridges without loss of some of the desired functions and foolproof operation. As mentioned above, a cartridge handling mechanism must be provided with means for automatically stopping the tape before the end of the tape on the reel or hub is reached. It is a feature of the present invention to provide a coordinated combination of pushbutton controls and mechanisms for stopping the tape before the end thereof is reached.

While flexibility of control functions and foolproof operation are necessary in a mechanism of the type provided by the present invention, low-cost and ease of manufacture are of equal importance since the magnetic recording and reproducing apparatus is intended for the home entertainment market which is now occupied by low-cost disc record phonographs. In the past, magnetic recording and reproducing apparatus has not been completely satisfactory for home entertainment purposes because of lack of convenience of operation of a magnetic recorder and because of the high cost of the tape record and associated equipment. Such high cost has, in part, been attributed to the system for driving the magnetic record at constant speed. For example, separate reel motors of high quality and extensive pulley or gear trains have been used in recorders designed prior to the present invention. Such prior tape driving systems have sometimes required complicated linkage mechanisms and electromagnetic systems for the control thereof. The mechanisms necessary to apply braking forces to the reels to stop the tape have been similarly of a complicated nature. The present invention provides a low-cost reel driving system which requires only one motor and which is readily controlled with an integrated pushbutton control mechanism. Thus, a magnetic recording and reproducing apparatus provided by the present invention may be purchased at a low cost and operated with convenience and ease.

It is, therefore, a primary object of the present invention to provide a low-cost magnetic recording and reproducing apparatus for handling magnetic records carried in cartridges which may be conveniently and safely operated by untrained persons.

It is another object of the present invention to provide an improved mechanism for magnetic recording and reproducing on records carried by a cartridge which includes simplified mechanisms providing all of the functions necessary during magnetic recording and reproducing.

It is still another object of the present invention to provide an improved mechanism for reeling elongated magnetic records carried by enclosed cartridges which automatically stops the record before the end thereof is reached.

It is still another object of the present invention to provide an improved mechanism for transporting elongated magnetic records which automatically stops the movement of the record before the end thereof is reached without breaking the records.

It is still another object of the present invention to provide an improved transport mechanism for handling elongated records which stops the movement of the record upon increased tension in the record.

Still another object of the present invention is to provide a mechanism for handling tape records adapted to be carried in a cartridge, which mechanism is adapted for use with a simplified function selection mechanism.

It is still another object of the present invention to provide a mechanism for handling tape records adapted to be carried in a cartridge having pushbutton controls which are coordinated with a mechanism for stopping the record before the end thereof is reached.

It is a still further object of the present invention to provide an improved mechanism for transporting a magnetic tape record carried in a cartridge which is easily adjusted for optimum operating efficiency.

It is a still further object of the present invention to provide an improved mechanism for transporting a magnetic tape record carried in a cartridge having a simplified tape drive system.

The present invention, briefly described, comprises an improved tape transport mechanism for reeling an elongated magnetic record, such as a magnetic tape, enclosed within a cartridge, and mechanism for controlling the operation for the tape transport mechanism. The tape is reelable between reels or hubs contained within the cartridge. The mechanism includes an arrangement of magnetic heads, tape guides and tape driving capstan arranged along the path of tape travel between the reels or hubs. Movable elements may also be disposed along this path for sensing the tension in the tape. A control mechanism, which may include a plurality of pushbuttons, selects the operational function which is desired, such for example, as tape reeling at slow speeds for playback and recording, tape reeling at high speed in a forward direction, tape reeling at high speed in a rewind or reverse direction, and stop. A mechanism is provided which is responsive to the tension in the tape and may include a toggle linkage set by the selected pushbutton. This mechanism is associated with an element which senses the tension in the tape. The drive system for capstans and hubs includes an arrangement of movably mounted pulleys which may selectively be frictionally coupled to a drive motor and to the capstan and hubs. The tension responsive mechanism is disposed in cooperative relationship with the drive system and with the control pushbuttons. Thus, when a desired function is selected by operation of a control pushbutton, the elements of a tape tension sensing mechanism are placed in operative relationship and, in turn, the selected pulleys are placed in driving relationship with the capstan and/or the hubs. The tension sensing mechanism locks the driving system and the control system to maintain the selected function control. The tension in the tape increases to a predetermined amount immediately before the tape reaches the end of its run and just before the tape is completely unwound from the hub which is supplying tape. Upon sensing the increased tension, the tension sensing mechanism unlocks and releases the control and the drive pulley so as to permit the mechanism to stop.

The invention itself, both as to its organization and method of operation, as well as the foregoing and other objects and advantages thereof, will become more readily apparent from a reading of the following description in connection with the accompanying drawings in which.

Figure 2:
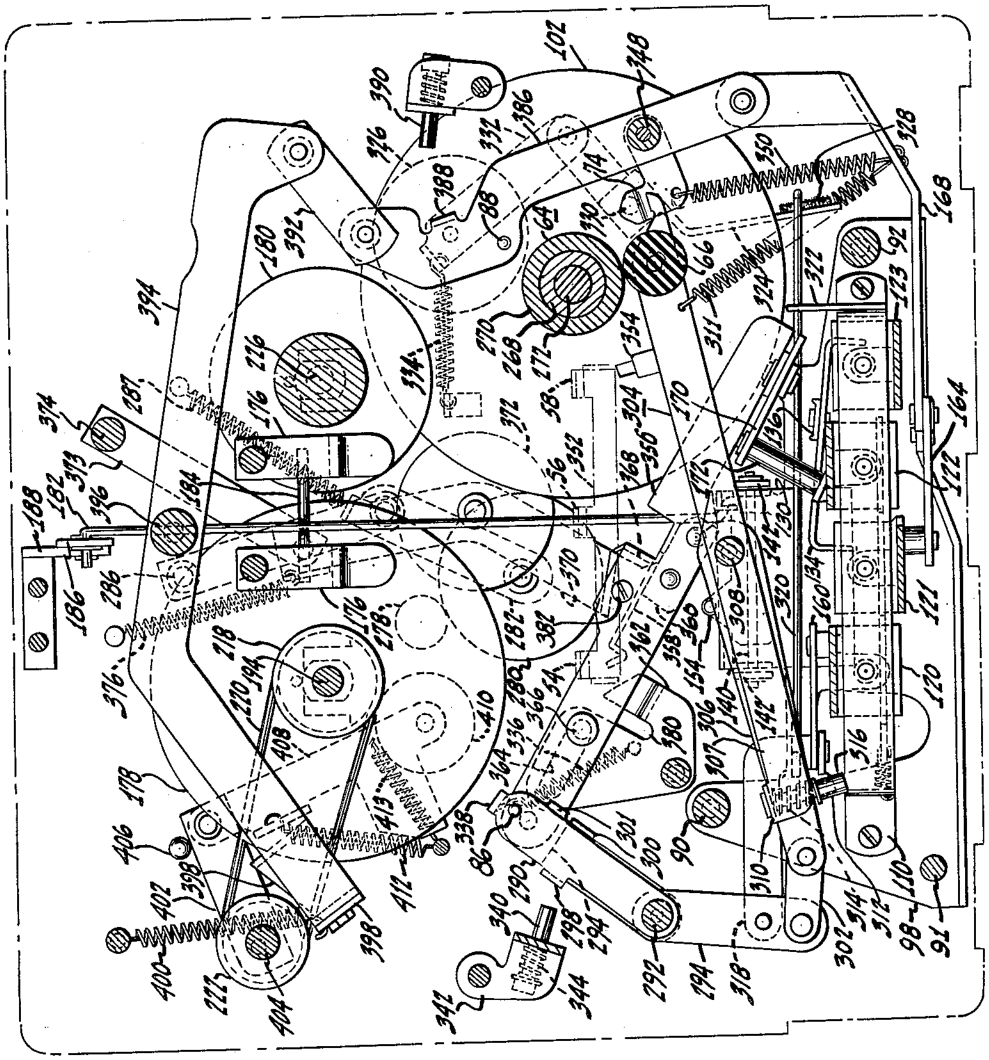
FIG. 2 is a sectional view of the mechanism shown in FIG. 1 with the tape deck panel removed, the mechanism being shown in the idle or stop position.
Figures 9, 10, 11, 11A, 15, 16:
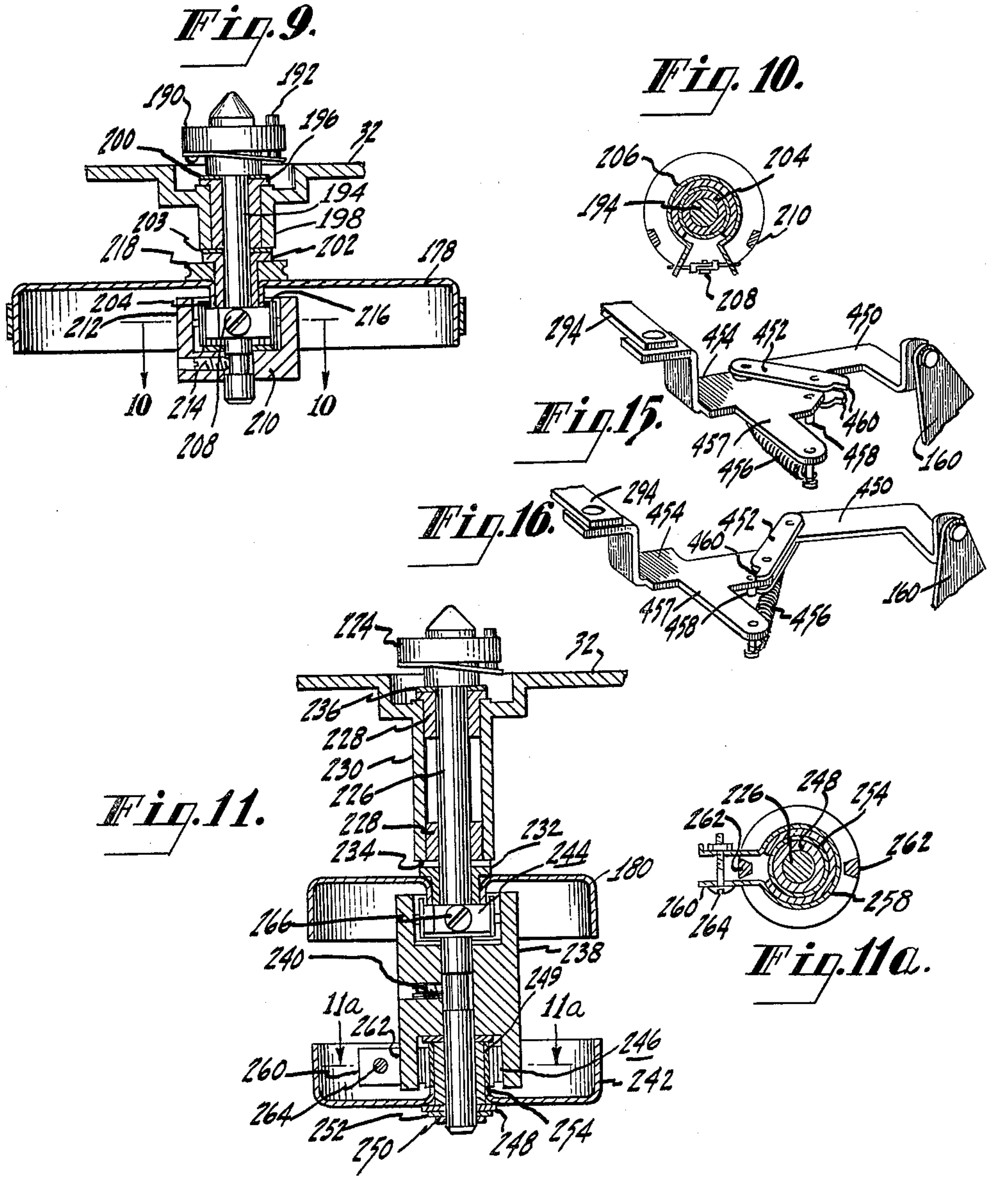
FIG. 9 is a fragmentary sectional view showing the supply hub assembly.
FIG. 10 is a sectional view taken along the line 10—10 in FIG. 9.
FIG. 11 is a fragmentary sectional view showing the takeup hub assembly.
Figure 12:
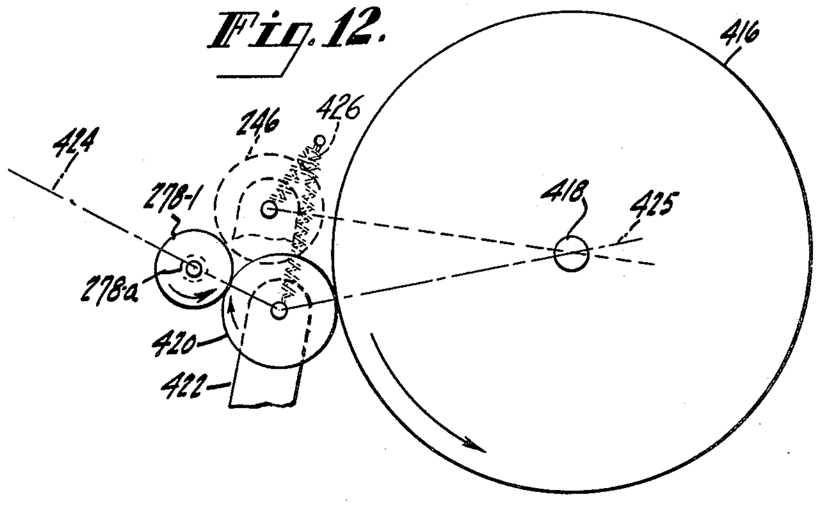
Figure 13:
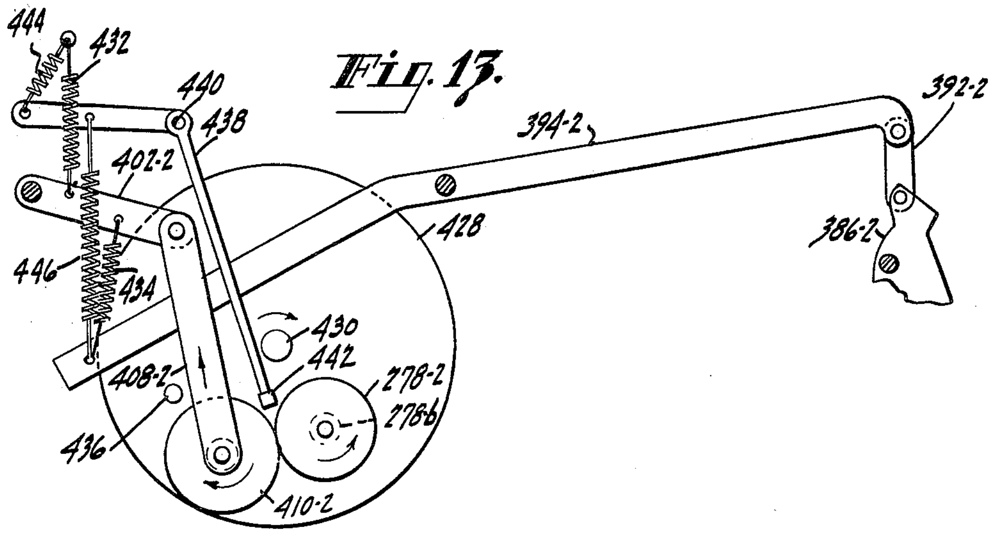
Figure 14:
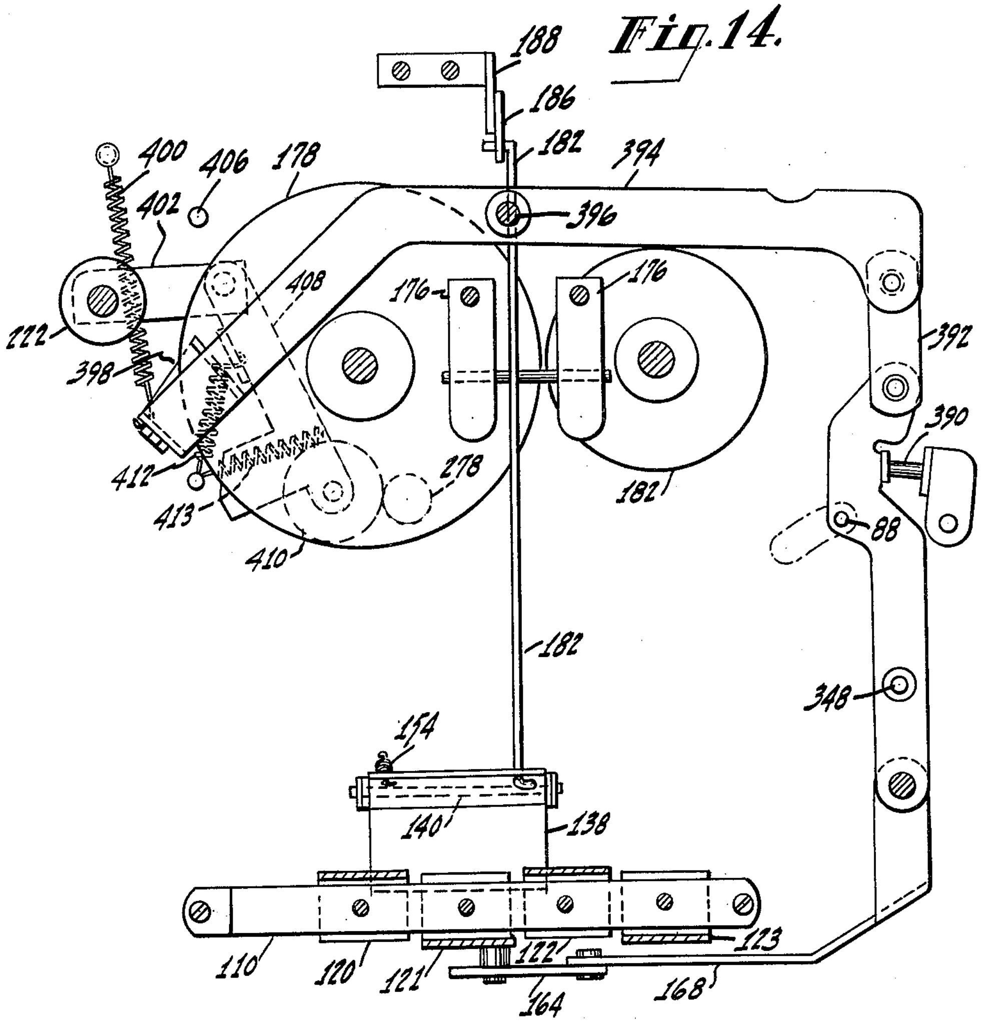

FIG. 11*a* is a sectional view taken along the line **11*a*—11*a*** in FIG. 11;

FIG. 12 is a top plan view schematically showing another hub pulley driving system;

FIG. 13 is a fragmentary top plan view similar to FIG. 12 showing still another hub pulley driving system;

FIG. 14 is a top plan view similar to FIG. 2 showing certain parts of the tape transport mechanism conditioned for rewinding the tape on the supply hub at high speed;

FIG. 15 is a fragmentary perspective view of the tension responsive mechanism which is operative during normal reeling with another linkage in place; and FIG. 16 is a view similar to FIG. 15 with the linkage shown therein in extended position.

Referring more particularly to the drawings, a tape transport mechanism incorporating the features provided by the present invention is shown. The amplifiers associated with the tape transport mechanism are not illustrated since they do not form part of the present invention. However, these amplifiers and associated electronic circuits provide for the recording and reproduction of signals on a magnetic tape 22 carried in a tape cartridge 20. Stereophonic or monaural recording and reproduction on four adjacent record tracks on the tape is possible. For stereophonic recording and reproduction, two record tracks are simultaneously scanned. When the end of the tape is reached, the cartridge 20 is turned over and a different pair of the four record tracks on the tape is scanned. For monaural recording and reproduction, one of the tracks on the tape is scanned and the cartridge is turned over when the end of the tape is reached so as to permit another track to be scanned. The cartrige may be successively turned over to scan the other two remaining tracks. A recording of two hours' duration may be recorded or played back on the tape in a single cartridge, if monaural recording or reproduction is desired, and one hour of stereophonic recording or reproduction is also possible. The playing times mentioned above are obtainable, for example, when the cartridge contains 600 feet of tape reeled at 3¾ inches per second.

Figure 1:
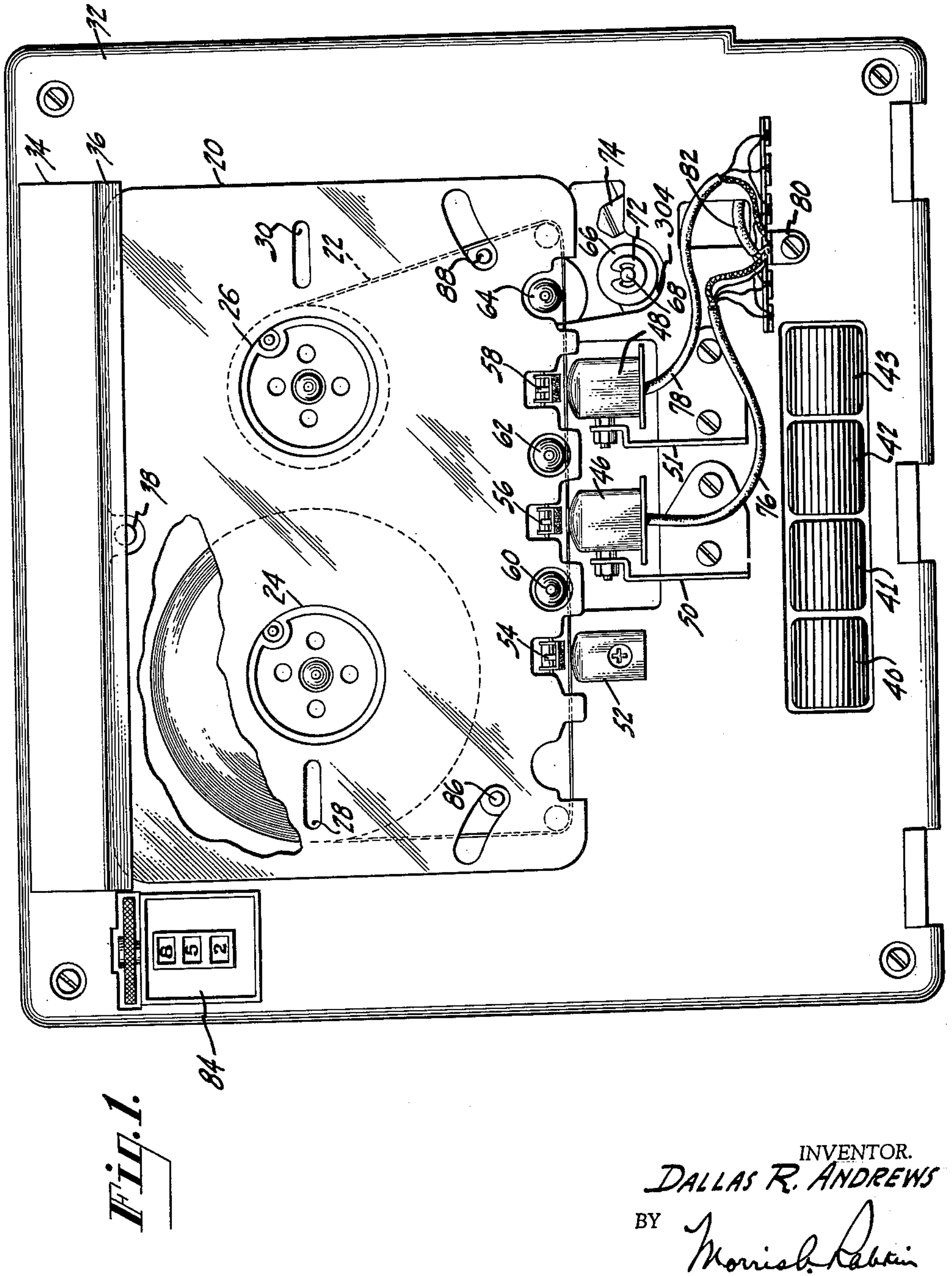
FIG. 1 is a top plan view of a magnetic tape transport mechanism provided in accordance with the present invention for handling magnetic tape records carried in cartridges and showing a cartridge in place on the mechanism and with a decorative and protective escutcheon removed.

The tape cartridge 20 shown in FIG. 1 of the drawings is described in detail in a patent application filed in the name of Dallas R. Andrews, Ser. No. 738,745, filed May 29, 1958, now Patent No. 3,027,110 granted March 27, 1962. Essentially the cartridge is of the coplanar type and may be of a size capable of being stored in any average book shelf. The cartridge comprises a plastic case made in two parts. The tape is wound on two hubs 24, 26 which will be referred to hereinafter as a supply hub and a take-up hub, respectively, depending upon whether they are located on a supply turntable or a take-up turntable of the mechanism. These turntables will be described in detail hereinafter. A metal slide (not shown) is biased by a spring to brake the hubs during shipping and storage. Two sheets of polyester film are disposed adjacent the walls of the cartridge. These sheets close windows 28 and 30 used to indicate the amount of tape remaining on the supply hub 24 and take-up hub 26 when the tape is being reeled. The sheets also separate the brake slide from the tape, reduce friction which would otherwise exist between the tape edges and the walls of the case, and trap a film of air between the sheets and the walls of the cartridge case for damping and noise reduction.

The outside of the tape transport mechanism is shown in FIG. 1. This mechanism is mounted on a deck panel 32. A back stop bar 34 is located on the rear of the panel. This bar provides a shelf 36 under which the cartridge is received. A pin 38 is located in the center of the back stop 34 and partially under the shelf 36.

Four manual pushbuttons 40, 41, 42 and 43 are provided. The functions of these buttons 40 to 43 are to condition the tape transport mechanism, respectively, for the following functions or operations: play or record, rewind, fast forward and stop. A pair of magnetic heads 46 and 48 are each mounted on a different bracket 50 and 51 on the panel 32. These heads are substantially identical and each contains two separate core structures. The head 46 is operated as an erase head and the head 48 is operated as either a recording or reproducing head. The cores on the two heads 46 and 48 are aligned so that erasing and recording may take place successively on the same two record tracks. Of course, during reproducing operations, the erase head 46 is de-energized. The two cores in each of the heads are separated by a predetermined distance to permit two pairs of record tracks to be interleaved so that one pair of tracks may be recorded or reproduced when the cartridge is in one position and the other pair of tracks may be recorded or reproduced when the cartridge is turned over and is in inverted position. One of the cores of each of the heads 46, 48 operates during monaural recording, while both of the cores in the heads 46 and 48 are energized for stereophonic recording operations. The energization of the heads is controlled by switches associated with the electronic amplifier and other circuits of the magnetic recording and reproducing apparatus. A curved block 52 is used in place of a third head so as to provide a balanced array. An assembly consisting of three pressure pads, 54, 56 and 58 cooperates, with the block 52 and the heads 46 and 48. These pressure pads are simultaneously actuated to press the tape 22 against the heads by a mechanism to be described hereinafter. The block 52 cooperates with the pad 54 to apply drag tension on the tape 22 thereby eliminating any slack in the tape at the heads which could possibly cause irregular head to tape contact and produce distortion. A pair of tape guides 60 and 62 are located on opposite sides of the center pressure pad 56.

A capstan 64 for driving the tape is located to the right of the heads and pressure pad assembly as viewed in FIG. 1. This capstan is driven at a constant rotational speed by a driving system to be described hereinafter. A pressure roller 66 is mounted on the opposite side of the tape from the capstan 64. The pressure roller may be made of some resilient material such as rubber. The roller 66 is rotationally mounted on a stud 68 which projects from an arm 304 referred to more particularly hereinafter. A clamp fastener 72, such as a C-washer, may be used to fasten the roller on the stud 68. A hold-down member 74 having an L-shaped projection may be moved with the pressure roller 66 toward the cartridge by an actuation mechanism, to be described hereinafter. Since the hold-down member projects over the top of the cartridge during the time that the pressure roller is in contact with the capstan, the cartridge cannot then be removed. This prevents any possibility of tape breakage by any untimely attempt to remove the cartridge during play or record operations. It will be appreciated that this hold-down member is one of the features which makes the mechanism provided by the present invention foolproof in operation.

Leads 76 and 78 from the heads are connected to a connector strip 80 mounted on the panel 32. Other leads 82 from the connector strip extend through an opening in the panel 32 and are connected to the electronic equipment associated with the tape transport. A decorative and protective escutcheon (not shown) which may be artistically designed may be placed over the block 52, head 46, pressure roller 68, brackets 50 and 51 and connector 80. This escutcheon may carry a legend indicating the function of each of the pushbuttons 40 to 43. This escutcheon is not shown to illustrate the placement of the aforementioned elements, on the panel 32.

A counter 84 which may be of conventional design is located in the left rear corner of the panel. This counter is coupled to the supply hub assembly to be rotated therewith and indicate the amount of tape that has been unreeled from the supply hub.

Pins 86 and 88 for sensing the tension in, and position of, the magnetic tape as it is reeled between the hubs 24 and 26 extend through openings in the panel 32 as well as in the cartridge 20. These pins are shown in the position they occupy when the recorder is stopped; i.e., after the stop button 43 has been depressed. The pin 86 serves the purpose of determining the tension in and position of the tape as it leaves the supply hub and therefore the amount of tape left on the supply reel. The pin 88 senses the tension in the tape adjacent the take-up hub 26 and therefore determines the amount of tape remaining on the take-up hub. When either the play/record pushbutton 40 or the fast forward pushbutton 42 is depressed, the pin 86 will be moved to the left so as to ride against the tape. Similarly, the other pin 88 will be moved toward the right when the pushbutton 41 is depressed. At the end of a run of tape (when the tape reaches a point near its end on the hub) during forward reeling operations, the pin 86 will be moved toward the right so as to actuate a tension responsive mechanism to be described hereinafter. The other pin 88 operates in a similar manner during rewind operations.

Operation of the tape transport mechanism is extremely convenient. The rear edge of the cartridge 20 is placed under the shelf 36 of the bar 34. The front of the cartridge is merely pressed downward. The cartridge is then automatically disposed in place on the deck panel 32 with the tape path properly located between the pressure pads, guides and capstan and the heads. The brake slide is released since it will be advanced by the pin 38 to a position where it releases the hubs. For recording or playback operations, the play/record pushbutton 40 is pressed. The tension sensing pin 86 is also shifted to the left so as to ride against the tape 22. The machine is energized and the tape is reeled across the heads from the supply hub 24 to the take-up hub 26. When the tape is nearly exhausted on the supply hub 24, the tension in the tape adjacent the pin 86 increases and the pin 86 is moved to the right. The tension responsive mechanism operates to stop the tape and causes the pressure roller and pressure pads to be released from their positions against the capstan 64 and heads 46 and 48, respectively. The cartridge may then be removed and turned over to play the next record track or tracks. Fast forward or rewind operations may be similarly executed by pressing either the fast forward or rewind pushbuttons 41 and 42. To stop the tape at any point, the stop button 43 is pressed. The mechanisms for controlling the recorder are located below the panel 32 and will be described in connection with FIGS. 2 to 11 and 14.

Figures 3, 4:
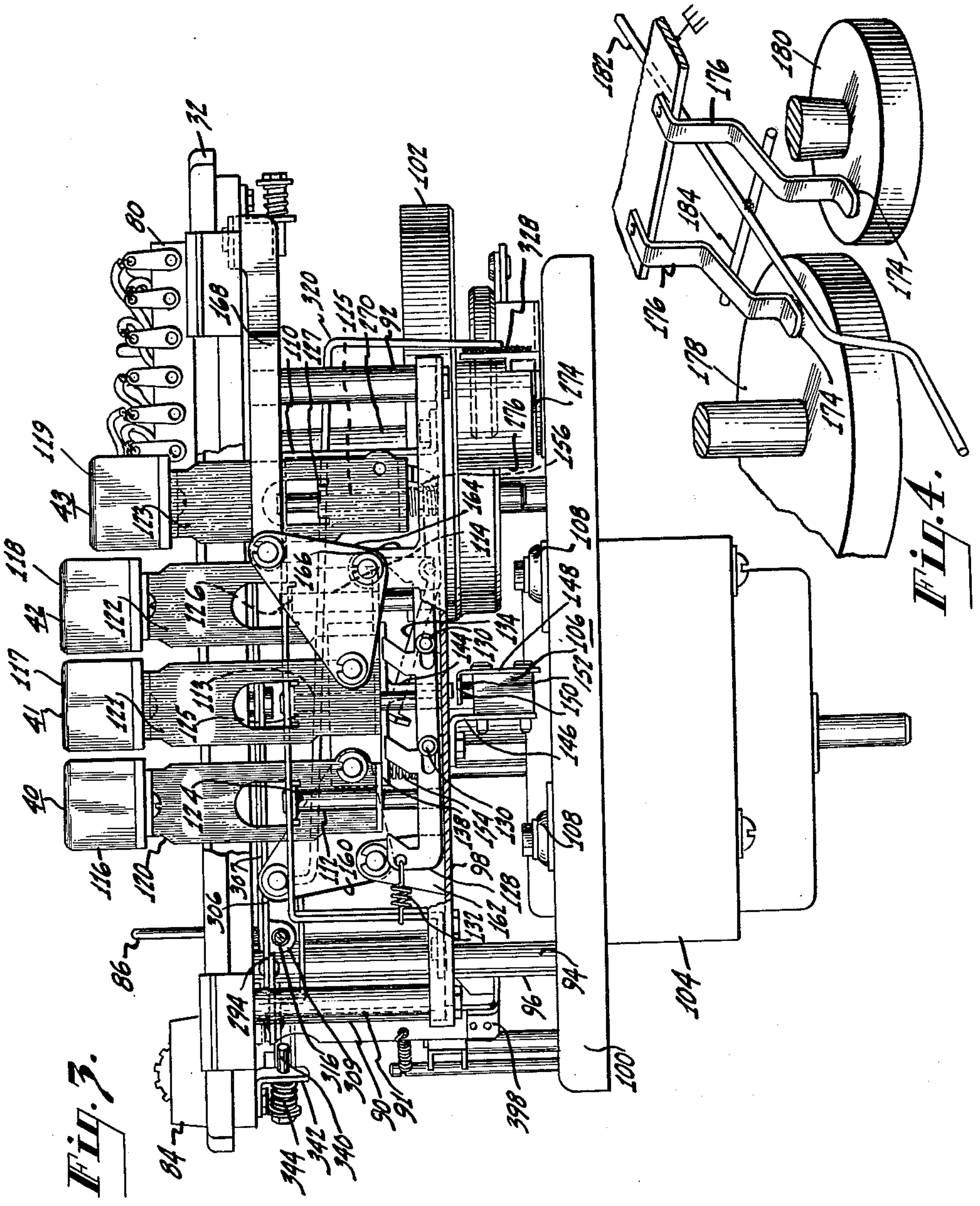
FIG. 3 is a front elevational view of the mechanism shown in FIG. 1 with the deck panel partially broken away to illustrate the pushbutton mechanism.
FIG. 4 is a fragmentary perspective view schematically showing the brake mechanism of the tape transport mechanism illustrated in FIGS. 1, 2 and 3 shown with the brakes applied.

The general arrangement of the tape transport mechanism is shown in FIG. 3. The cartridge is shown as being removed from the tape deck panel 32. A plurality of posts depend from the tape deck panel. These include short posts 90, 91 and 92 and longer posts 94 and 96. One of the long posts is not shown. The short posts 90, 91 and 92 support a chassis member 98. The pushbutton assembly for the mechanism is supported between this chassis member 98 and the tape deck panel 32. Another lower chassis member 100 is supported by the long posts including posts 94 and 96. This lower chassis member provides a bearing support for a capstan flywheel 102 to be discussed hereinafter. The lower chassis member 100 also has an opening for receiving an electric motor 104 which drives the mechanism. This motor 104 is energized through a switch 106 of the microswitch variety which is mounted on the upper chassis member 98. A plurality of rubber mountings 108 cradle the motor and provide substantially vibration-free support therefor.

In order to more clearly describe this illustrative embodiment of the present invention, the pushbutton mechanism will be described next. The pushbutton mechanism, per se, forms the subject matter of an application, Serial No. 809,267 filed in the name of Philip J. O'Connell concurrently herewith. A description of the brake mechanism will follow the description of the pushbutton mechanism. This brake mechanism, per se, also forms the subject matter of the aforesaid O'Connell application. The assemblies for the supply and take-up hubs will be described thereafter. The capstan assembly will then be described. Following the description of the capstan assembly will be descriptions of the tension responsive mechanism. The capstan and hub drive system will be discussed last to provide a clearer understanding of the novel combination of the pushbutton control mechanism, the tension responsive mechanisms and the drive system.

Figures 6, 7:
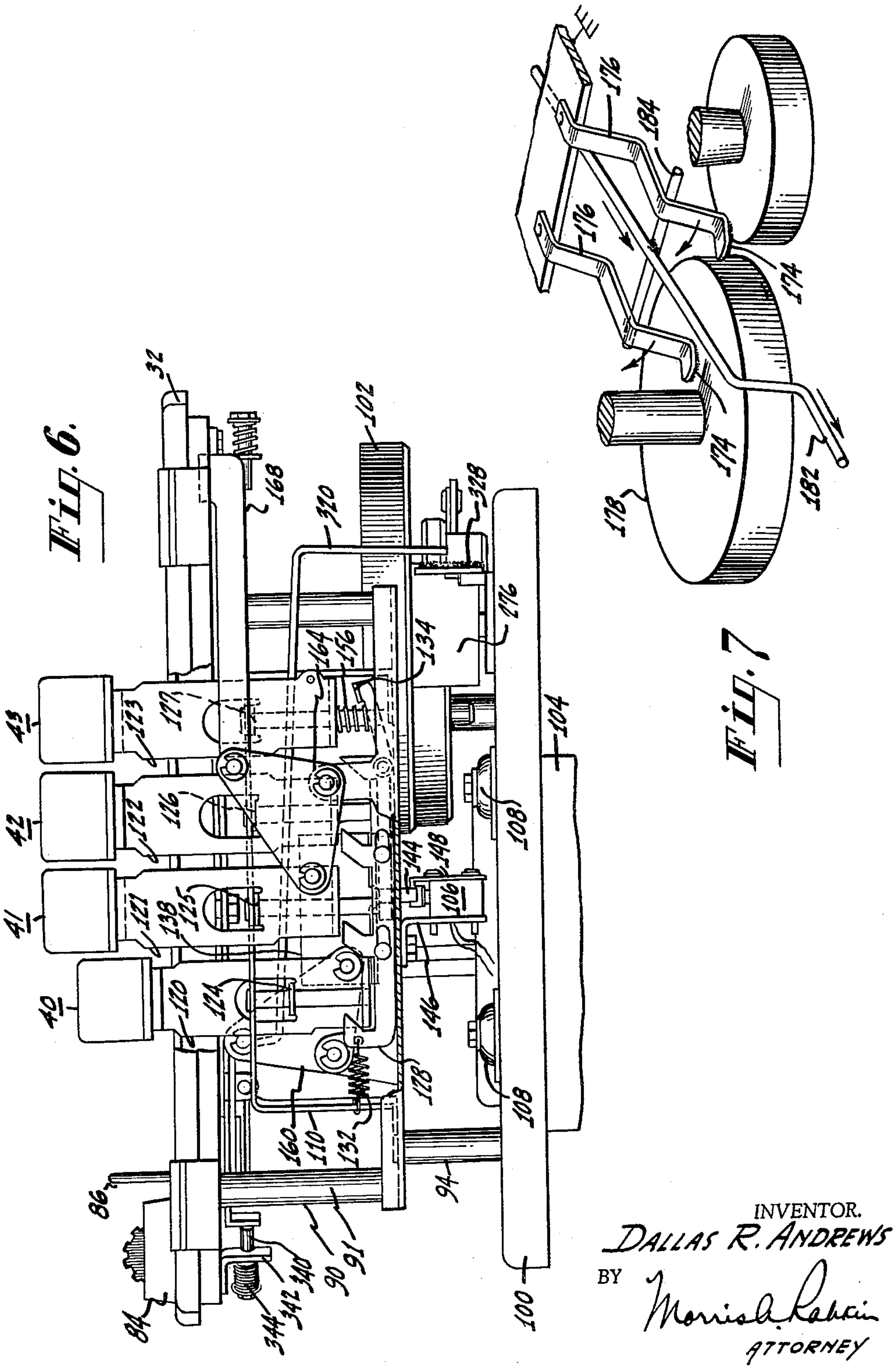
FIG. 6 is a fragmentary elevational front view similar to FIG. 3 showing certain parts of the pushbutton assembly positioned to condition the tape transport mechanism for slow speed reeling in the forward direction during playback or recording operation.
FIG. 7 is a fragmentary perspective view similar to FIG. 4 schematically showing the brake mechanism of the tape transport mechanism with the brakes released.

The pushbutton mechanism is best shown in FIGS. 2 3 and 6. The mechanism is supported on the lower chassis member 98 by means of a bracket 110. This bracket is a U-shaped outboard bearing bracket. Each pushbutton is carried on a different one of four pushbutton shafts 112, 113, 114 and 115. These shafts are secured between the lower chassis member 98 and the bearing bracket 110. Each of the knobs 116, 117, 118 and 119 of the pushbuttons 40, 41, 42 and 43, respectively, are fastened to the top of a different one of four pushbutton knob brackets 120, 121, 122 and 123, respectively. Each of the knob brackets 120 to 123 has flanges at the opposite ends thereof. Each of the knob brackets 120 to 123 has a tongue 124, 125, 126 and 127, respectively, extending from the center thereof between the end flanges. The tongue and the flanges of each knob bracket extend in the same direction. The tongues and lower end flanges of the knob brackets are mounted for movement on the shafts 112, 113, 114 and 115. Two of the pushbutton knob brackets are located along one edge of the bearing bracket 110, while the other two of the pushbutton knob brackets are located along the other edge of the bearing bracket 110. Adjacent ones of the tongue and end flanges extend in opposite directions. This arrangement of the pushbutton brackets around fixed shafts provides for greater rigidity of the pushbutton assembly, conserves space, and provides for convenience of assembly of the pushbutton element with associated motion transfer mechanisms to be described hereinafter.

The lower end flanges of each of the pushbutton brackets 120 to 123 cooperate with a locking slide 128. This locking slide has a pair of elongated openings therein. A pair of tongues project from the lower chassis member 100. Studs 130 project from each of these tongues and extend through the openings in the locking slide 128. The locking slide may therefore slide from left to right over a distance limited by the length of the openings. The slides 128 are kept in place by C-washers fastened to the studs 130. A spring 132 biases the locking slide to the left so that it assumes the position shown in FIG. 3. The locking slide has a plurality of teeth extending therefrom upwardly toward the top of the bearing bracket 110. These teeth have edges which are inclined in the same direction toward the right. The teeth are also separated by a distance slightly greater than the width of any of the bearing brackets 110.

There are four teeth on the locking slide and three openings defined by the adjacent edges of the different teeth. The end flanges of the knob brackets 120, 121 and 122 may be received, only one at a time, within different ones of these openings defined between the teeth of the locking slide 128, when the pushbuttons 40, 41, 42 are depressed.

The end flange of the knob bracket 123 of the stop pushbutton 43 is disposed to cooperate with a pivotally mounted lever 134 which is in the nature of a bellcrank and acts as a stop lever. The lever is pivotally mounted on a bracket attached to the upper chassis member 98. One end of this stop lever 134 is bent toward the front of the machine to provide a greater contact surface adjacent the end flange of the bracket 123. The other end of the lever 134 is also bent in the same direction as the first mentioned end. A relatively wide bellcrank lever 138 is associated with the lever 134. This bellcrank lever is pivotally mounted on a shaft 140 carried by a pair of flanges 142 on the upper chassis member 98. A tongue 144 extends from the lower arm of the bellcrank lever 138. This tongue actuates the switch 106 which controls the motor 104. The switch 106 is fastened to the upper chassis member 98 by means of a bracket 146. Another bracket 148 is carried by the switch 106. This bracket 148 is made of spring material, such as bronze, and provides a spring switch actuating arm 150. This arm 150 cooperates with the arm 152 of the switch 106 and is adapted to be depressed by the tongue 144 when the bellcrank lever 138 pivots downwardly. The bellcrank lever 138 is also biased to pivot upwardly by means of a spring 154 attached between the upper chassis member 98 and the top of the upper arm of the bell crank lever 138.

The purpose of the bellcrank lever 138 and stop lever 134 is to cooperate with the stop pushbutton 43 for stopping the machine when the pushbutton 43 is depressed. A spring 156 is wound around the pushbutton shaft 115 for the stop pushbutton 43. This spring biases the pushbutton 43 in the upward direction. It will be noted that no similar bias springs are disposed on the shafts 112, 113 and 114 supporting the other pushbuttons 40, 41 and 42. These pushbuttons are depressed to condition the machine to perform different operating functions. The lower flanges of the knob brackets 120, 121 and 122 of these pushbuttons 40, 41 and 42 also engage the lower arm of the bellcrank 138 which, when any of these pushbuttons 40, 41, 42 is depressed, tends to bias these buttons upwardly to their original position.

These pushbuttons 40, 41 and 42 will be caused to remain down when depressed by virtue of the mechanisms associated therewith. These mechanisms will be described hereinafter. The mechanism associated with the play pushbutton 40 is coupled thereto by means of a bellcrank 160. This bellcrank 160 is pivotally mounted on a tongue 162 extending from the upper chassis member 98. The mounting is by means of a stud and C-washer arrangement used throughout the entire mechanism to simplify the construction for lower cost. The bellcrank 160 is secured to the knob bracket 120 by means of a pivotal mounting consisting of another stud and C-washer. The rewind pushbutton 41 is similarly connected to a rewind bellcrank 164 which is pivotally mounted to a tongue 166 extending from the upper chassis member 98. This tongue is pivotally connected to the knob bracket 121 of the rewind pushbutton 41 and to the mechanism associated with the rewind pushbutton by way of a rewind connecting link 168. The fast forward pushbutton 42 is also connected to a bellcrank 170 (best shown in FIG. 2) by means of a longer coupling stud 172 than used in the case of the other bellcranks. Accordingly, the mechanisms coupled to each of the pushbuttons 40, 41 and 42, by way of their associate bellcranks 160, 164 and 170, respectively, maintain these pushbuttons in down position despite the bias of the spring 154 associated with the bellcrank lever 138.

As shown, particularly in connection with FIG. 6, when any of the pushbuttons 40, 41, 42 is down, say for example, the play pushbutton 40, as shown in FIG. 6, the locking slide 128 is urged against the bias of its spring 132 toward the right. This is accomplished by the force exerted on the inclined one of the teeth engaged by the end flange of the play/record knob bracket 120. It will be observed that the upper edges of the teeth are disposed in a position to block the descent of either of the rewind or fast forward pushbuttons 41 and 42, respectively. The case would be the same for either of these pushbuttons 41, 42 when depressed. Then the remaining two pushbuttons could not be depressed. The pushbuttons must be restored to their initial up position by pressing the stop pushbutton before another functional operation of the machine can be selected. Of course, the stop pushbutton need not be depressed if the mechanism is stopped automatically, as would occur upon reaching the end of the tape. This automatic stopping mechanism will be described hereinafter.

The mechanism comprising the levers 134 and 138 which are associated with the stop pushbutton 43 provide an improved means for stopping the operation of the apparatus and for restoring any of the down pushbuttons 40, 41 and 42 to up position. The convenience of operation and low cost of parts and manufacture will be evident from the foregoing description and the drawings which illustrate the disclosed embodiment of the invention. It will be noticed that the pivot lever 134 rotates in a clockwise direction when the stop pushbutton is pressed. This lever engages the lower arm of the bellcrank lever 138. Since the lower arm of the bellcrank lever 138 also engages the end flanges of each of the knob brackets 120, 121, 122, any one of these brackets which happens to be in down position due to the actuation of the pushbutton associated therewith will be urged to up position. A minimum amount of force is necessary to accomplish the stopping operation since a spring bias is already being exerted on the bellcrank lever 138 which tends to pivot this lever in an up direction and also because of the nature of the tension responsive mechanisms associated with each of the pushbuttons 40, 41, 42.

Since the switch operating tongue 144 of the bellcrank lever 138 is pushed downwardly when any of the operating pushbuttons 40, 41 or 42 are pressed, the switch 106 will be actuated when any of these pushbuttons 40, 41 or 42 are depressed. The switch is normally maintained unactuated by means of the spring arm 150 and will be returned to unactuated position when the stop pushbutton 43 is depressed. Since the motor 104 will not operate until the switch 106 is actuated, the mechanism will be idle until conditioned for operation by depressing one of the pushbuttons 40, 41 or 42.

The brake mechanism is associated with the system of levers 134 and 136 which are actuated by the stop pushbutton 43. This brake mechanism is best shown in FIGS. 2, 4 and 7 of the drawings. The brake shoes are pads 174 of friction material, such as felt, cemented or otherwise attached to the upturned ends of spring members 176. These members are secured to the side of the deck panel 32 and are essentially Z-shaped to provide sufficient leverage and spring action. However, any other shape which would fit among the other elements of the apparatus would be suitable. The brake shoe pads 174 cooperate with the upper faces of a drive pulley 178 for the supply hub. The other one of the brake shoe pads 174 cooperates with the upper surface of a drive pulley 180 for the take-up hub 26. The brake shoes are controlled by a brake control rod 182 and a transverse rod 184 welded or otherwise attached to the brake control rod so as to lie perpendicular thereto. This transverse rod engages the spring members 176 simultaneously so as to lift the pads 174 against the bias of the spring members 176 from the pulleys 178 and 180. The back end of the brake control rod 182 is pivotally mounted at one end of a link 186. This link 186 is mounted on a bracket 188. The front end of the brake control rod 182 is pivotally mounted to the bellcrank lever 138. Thus, the brake control rod 182 swings on the link 186 as it moves with the bellcrank lever 138 between the front and the rear of the mechanism. The control rod 182 also may reciprocate from a lower position as shown in FIG. 4 of the drawings to an upper position as shown in FIG. 7 of the drawings because of its pivotal mounting on the link 186.

Accordingly, when the mechanism is in idle condition, the bellcrank lever 138 will be urged under its spring bias in a clockwise direction. Accordingly, the brake control rod will be urged to the rear of the machine and the link 186 will be substantially perpendicular to the rod. In this position, as shown in FIG. 4, the transverse rod 184 will not interfere with the action of the spring members 176 and the brakes will be applied. Upon pressing any one of the pushbuttons 40, 41, 42 which condition the mechanism for operation, the bellcrank lever 138 will be pivoted in a counter-clockwise sense so as to urge the brake control rod toward the front of the machine. This movement causes the link 186 to swing toward the front of the machine and brings the transverse rod to the upper position shown in FIG. 7. The spring members 176 will then be engaged and the brake pads 174 will be lifted from the pulleys 178 and 180. The brakes are, therefore, released automatically upon pressing any of the function selection buttons 40, 41, 42. When the stop button is depressed, the stop lever 134 pivots the bellcrank lever 138 in a clockwise direction back to its initial position when the mechanism was idle. This permits the brakes to be applied and stop the machine.

When the brakes are applied, particularly after fast reeling in either the forward or rewind directions, a considerable amount of energy due to the inertia developed by the motor 104 and other heavy moving parts might be applied to the tape. This energy could possibly cause the tape to break were it not for the assemblies for the supply and take-up hubs provided in accordance with the invention.

These assemblies are shown, more particularly, in connection with FIGS. 9, 10, 11 and 11*a* of the drawings.

Referring first to FIGS. 9 and 10 of the drawings, the assembly of the elements for driving the supply hub will be observed mounted on and under the deck panel 32. The supply hub 24 is carried on the supply hub turntable 190. This turntable has a spring loaded key 192 which fits into one of the openings in the supply hub. When the key is inserted into the supply hub, the hub rotates with the turntable. The turntable 190 is mounted on the supply hub shaft 194. This shaft is journaled in a bearing 196 which is mounted in a cylindrical bearing receptacle 198. This cylindrical bearing receptacle may be part of the deck panel and, for example, manufactured in the process of casting the deck panel 32. A shim 200 (made of stainless steel) is disposed at the top of the bearing 196 and provides a seat for the bottom of the turntable 190 on which it may turn and may be of different thickness to adjust the height of the turntable.

The supply hub pulley 178 is coupled to the shaft 194 through a clutch mechanism. This clutch mechanism insures that only a limited amount of torque is transferred to the shaft 194 regardless of the torque which is developed by the heavy moving parts in the mechanism and which might otherwise be transferred to the shaft. As mentioned above, this excessive torque could possibly cause the tape to break when reeling operations are terminated. A sleeve bushing 202 surrounds the lower part of the shaft 194. This sleeve bushing 202 rotates with the shaft. A washer 203 of cloth, plastic (cambric) or the like is disposed between the bushing 202 and the bearing 196 so as to silence any running noises. The supply pulley 178 has an inner flange 216 which bears upon the sleeve bushing 202 but does not sufficiently tightly engage this bushing 202 to rotate therewith. A clutch band 204 of soft material is disposed partially around the flange 216 and held in place by means of an adjustable clamp bracket 206. A friction ring is disposed around the bushing just below the flange 216. The bracket 206 is adjusted by means of a screw tightener 208 and is connected between the ends of the clamp bracket 206. The frictional coupling between the shaft 194 and the pulley 178 can be adjusted by tightening or loosening the screw 208. The clutch also includes a dog 210 having ears 212 which extend toward the turntable. This dog 210 is fastened to the shaft 194 by means of a set screw 214. The ears 212 of the dog 210 are engaged by the ends of the clamp bracket 206. Thus, as the pulley 178 rotates, the clamp 206 rotates into contact with the dog 210 and therefore is coupled through the dog, clamp, and band to the inner flange 216 of the pulley 178. The frictional coupling between the dog and the pulley 178 is such that any amount of torque in excess of a predetermined amount results in slippage of the band 204 on the flange 216 and the flange on the bushing 202. Thus, this excessive torque is not transferred to the shaft 194 through the dog 210. In the illustrative embodiment of the present invention, the band is adjusted for the transfer of approximately 3 or 4 inch ounces of torque. Any excess torque is dissipated in the clutch.

Another pulley 218 is mounted for rotation with the sleeve bearing 202. This pulley 218 is coupled by means of a belt 220 (see particularly FIG. 2) to another pulley 222 which drives the counter 84. The counter therefore counts the revolutions of the shaft 194 and may be used by the operator of the mechanism as a guide in determining the amount of tape remaining on the supply hub 24.

The assembly of elements for driving the take-up hub is illustrated in FIGS. 11 and 11*a*. The take-up hub 26 is carried by a take-up hub turntable 224 similar to the supply hub turntable 190. This turntable is rotated by a shaft 226. The shaft 226 is carried on sleeve bearings 228 which are disposed in a receptacle 230 which may be cast as a part of the deck panel 32. The sleeve bearing 232 rotates with the shaft 226. This bearing is similar to the bearing 202 shown in FIG. 9. The bearings are separated from each other by a noise silencing washer 234 and the turntable is separated from one of the bearings 228 by a shim 236 for height adjustment. A double ear dog 238 is secured to the shaft 226 by means of a set screw 240. Two pulleys 180 and 242 are mounted around the shaft 226. The pulley 180 was mentioned above and functions to drive the turntable 224 when the mechanism is conditioned for fast forward operation. Accordingly, this pulley 180 is known as the fast forward pulley. The other pulley 242 drives the turntable 224 during normal reeling operations and will be referred to herein as the take-up pulley.

The pulley 180 is frictionally coupled to the shaft 226 through the dog 238 by means of a clutch mechanism 244 which is similar to the clutch mechanism described above in connection with the take-up hub assembly. This clutch mechanism will be referred to herein as the fast forward clutch. Another clutch assembly 246 frictionally couples the take-up pulley to the shaft 226 through the dog 238 and will be referred to hereinafter as the take-up clutch. This latter assembly includes a sleeve bushing 248 which is mounted on the shaft 226. End play of this bushing 248 and of the take-up pulley 242 is prevented by means of a C-washer 250 which holds a shim 252 against the bushing 248.

The pulley 242 has an inner flange 254 which bears against the sleeve bushing 248. A friction ring 249 extends upwardly from the flange 254. A clutch band 256 of soft material, such as felt, is held against the inner flange 254 by means of a clamp bracket 258. This clamp bracket 258 has a pair of ears 260 which encompass an ear 262 on the dog 238. The amount of frictional coupling between the take-up pulley 242 and the shaft 226 may be adjusted by tightening or loosening a screw 264 which extends between the ears 260 on the clamp bracket 258. The amount of frictional coupling provided by the fast forward clutch may be adjusted by means of a screw 266 similar to screw 208 shown in FIG. 9. While different adjusting means are shown in the fast forward clutch assembly and in the supply hub clutch, the same adjusting means, either one or the other, may be used throughout. In the illustrative mechanism described herein, it has been found that an adjustment which permits the fast forward clutch to limit the torque coupled to the shaft 226 to approximately fourteen inch ounces and an adjustment of the screw 264 so as to limit the torque transferred to the shaft 226 by the take-up hub 242 to approximately three and one-half inch ounces will be suitable. These assemblies therefore effectively disconnect the drive motor and other rotating parts from the tape when the tape is stopped during braking and do not interfere with the operation of the mechanism during normal reeling operations either at fast reeling speeds or during play back or recording. The tape will not break since the force applied to the tape is not sufficient to exceed the rupture strength thereof in spite of the fast stopping of the tape, either automatically or when the stop button 43 is pressed.

The capstan 64 drives the tape during normal reeling operations for recording and playback. This capstan is shown in FIG. 1 extending through the deck panel 32. It is, of course, necessary for the capstan to drive the tape at a constant speed. Lack of constant speed manifests itself as flutter or wow. Flutter and wow can also be caused by slippage of the tape on the capstan. These defects are eliminated in the capstan assembly provided by the present invention which is best shown in FIGS. 2 and 3 of the drawings. Slippage is substantially eliminated by roughening the tip of the capstan which is adapted to engage the tape. This may be done by means of a roughening tool during the machining of the capstan 64. The capstan assembly is mounted in a bearing 268 carried in a receptacle 270 which may be cast integrally with the deck panel 32 as was the case for the receptacles 198 and 230 for retaining the supply and take-up hub shafts 194 and 226, respectively. The capstan 64 forms the tip of a capstan shaft 272. This capstan shaft is supported at the lower end thereof on the lower chassis 100 by means of a ball bearing 274 which is pressed in the lower end of the capstan shaft for end play support. Thus, end play of the capstan is substantially eliminated. The capstan flywheel 102 is mounted on the capstan shaft 272 for rotation therewith. This capstan flywheel has a boss 276 which may be an integral part thereof. The high flywheel inertia also provides for constant capstan speed. The entire capstan assembly including the flywheel 102 and boss 276 is balanced to further reduce the possibility of introducing speed variations.

The capstan 64 is driven by the motor 104. The motor has a shaft 278 which is frictionally coupled to the rim of the capstan flywheel 102. This frictional coupling is provided by an idler puck or pulley 280 which is carried on a floating link 282. This floating link 282 is pivotally mounted on the end of an arm 284 which is pivotally mounted on a stud 286 projecting from the lower chassis member 100. The link 282 is biased by means of a spring 287 which keeps the idler pulley 280 continuously in contact with the motor shaft 278 and the rim of the flywheel 102. Therefore, the capstan is rotated so long as the motor is energized. The pulleys 178, 180 and 242 for driving the supply hub 24 and take-up hub 26 are also coupled to the motor shaft through idler pulleys and/or the capstan flywheel assembly. These idler pulleys and the capstan idler pulley 280 provide the driving system for the mechanism. This driving system will be best described after the operation of the tension responsive mechanisms is more fully set forth, since the tension responsive mechanisms control the driving system by positioning selected ones of the idler pulleys in driving relationship, as will be explained more fully hereinafter.

Figure 8:
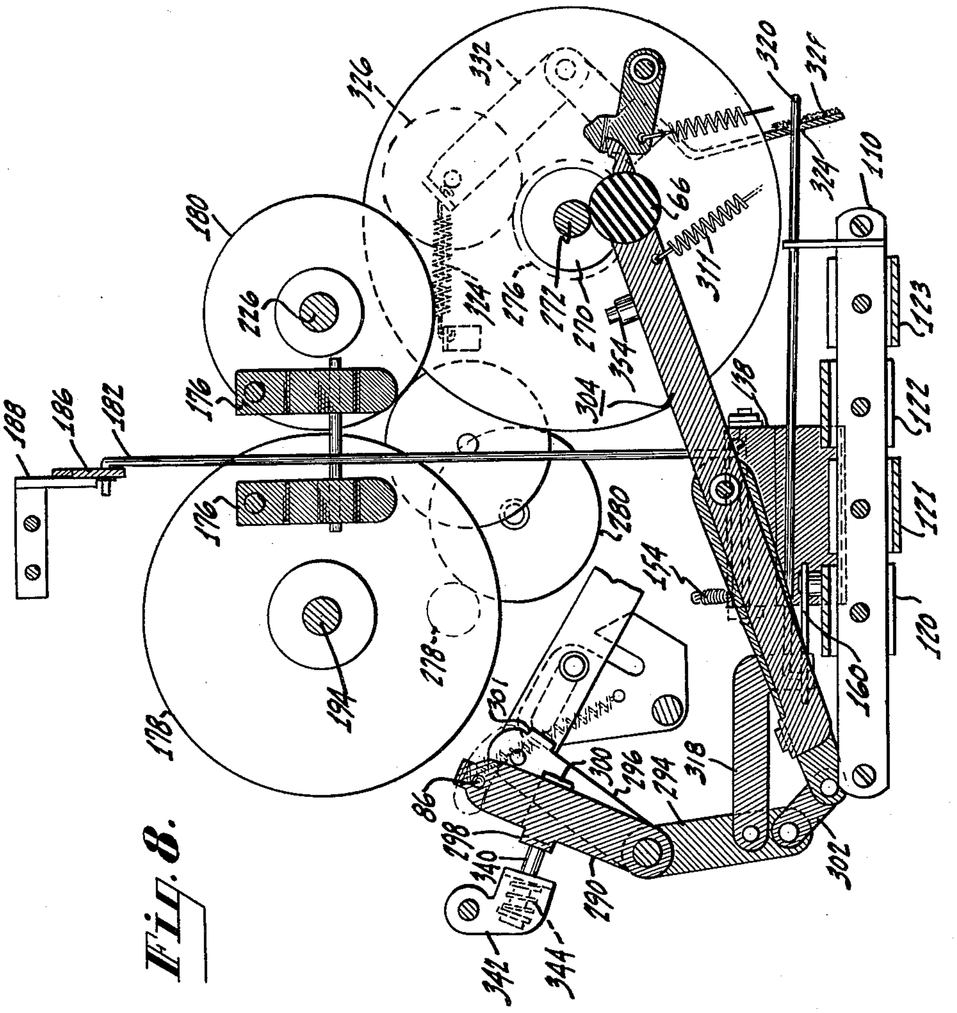
FIG. 8 is a top plan view similar to FIG. 2 showing certain parts of the tape transport mechanism conditioned for tape reeling at slow speed in the forward direction for recording and playback operations.

The tension responsive mechanism which is operative when the apparatus is conditioned for normal reeling operations during recording and playback is illustrated best in FIG. 2 and in FIG. 8. FIG. 2 shows the mechanism in idle condition as would be the case after the stop button 43 was pressed. FIG. 8 shows the mechanism after the pushbutton 40 has been pressed, which is also the condition shown in FIG. 6. Parts of this tension responsive mechanism were described in connection with FIG. 1. These include the tension responsive or trip pin 86. The pin 86 is carried by an arm 290. This arm 290 is pivotally mounted on a stud 292 which projects from the panel 32. The stud 292 also provides pivotal support for a bow-shaped lever 294 which is pivotally mounted on the stud 292 in the manner of a bellcrank. Another arm 296 is also pivotally mounted on the stud 292 below the lever 294. The arm 296 is associated with the tension responsive mechanism operative during fast forward reeling. The bow-shaped lever 294 is associated with the tension responsive mechanism operative during normal reeling. Both the lever 294 and the arm 296 are associated with the arm 290 carrying the pin 86. This association is accomplished by means of a finger 298 which depends from the arm 290. Fingers 300 and 301 extend upwardly from the edge of the bow lever 294, and the arm 296 in the fast forward tension responsive mechanism, respectively. The finger 301 on the arm 296 engages the arm 290 when the fast forward tension responsive mechanism is conditioned for operation.

Returning now to the tension responsive mechanism which is operative during normal reeling operations, it will be observed that a floating link 302 is pivotally connected to the bow lever 294. This floating link 302 and the bow lever 294 form a toggle joint. The floating link 302 is connected to the pressure roller carrying arm 304. This arm 304 is a dual arm having two sections 306 and 307. A finger 309 depends from the lower section 306. Another finger 310 depends from the upper section 307. These fingers are opposed to each other. Both sections are pivoted on a stud 308 depending from the panel 32. The section 307 and the arm 304 are biased for movement in the clockwise direction by a spring 311. The pressure roller 66 is therefore kept away from the capstan 64. Excessive movement of the arm 304 is prevented by the other links 302 and the lever 294 of the mechanism.

A screw adjustment device 312 is provided to adjust the force exerted by the pressure roller 66 against the capstan 64. This adjustment device is a screw which extends through the finger 309 on the lower section 306 and is mounted only for rotation (not translation) in the upper section 307 of the pressure roller arm 304 (the section which carries the pressure roller 66). A spring 314 is placed around the screw and pulls the opposed fingers 309 and 310 together. A nut 316 is threaded on the screw 312 and may compress or loosen the spring. Thus, when the pressure roller arm is pivoted in a counter-clockwise direction to bring the pressure roller 66 into contact with the capstan 64, the amount of pressure against the capstan is determined by the tension in the spring 314, which is an adjustable tension.

The end of the pressure roller arm 304 adjacent the pressure roller 66 extends to form a finger which is adapted to engage the member 74 which holds the cartridge down on the panel 32 when the pushbutton 40 is depressed. This member 74 is pivotally mounted on a stud 348 which depends from the panel 32. A spring 350 biases the member 74 toward the front and away from the cartridge. It will be observed, however, that when the pressure roller arm is actuated to pivot in a counter-clockwise direction to bring the pressure roller against the capstan 64, the end of the pressure roller arm will engage the member 74 and advance the member against the bias of its spring 350 into position over the cartridge.

Another function performed by the pressure roller arm, and consequently by this tension responsive mechanism, is the advancement of the pressure pads 54, 56 and 58 into contact with the heads. These pressure pads are mounted on a bracket 352. The bracket is pivotally mounted on another bracket (not shown) which extends from the bottom of the panel 32. A finger 354 extends from the front edge of the pressure roller arm 304. This finger engages the bottom of the bracket 352 and pivots the pressure pads against the heads. A spring (not shown) attached to the bracket 352 normally biases the pressure pads away from the heads.

The pushbutton 40 which selects normal reeling operations is coupled to the tension responsive mechanism through its associated bellcrank 160. This bellcrank is connected to an L-shaped motion transfer link 318. An improved linkage which may be used in place of the link 318 will be discussed later in connection with FIG. 15. The link 318 is connected to the bow lever 294. A rod connecting link 320 is linked to the L-shaped motion transfer link 318. This link 320 is supported on a bracket 322 which is attached to the U-shaped bracket 110 which supports the pushbuttons. The lever 320 is bent near the end thereof and descends to a position whereat it is in cooperative relationship with a lever 324.

This lever 324 is part of a linkage which controls an idler roller 326 in the take-up pulley drive system. The lever 324 has a pad 328 of felt or some other soft material to absorb the initial shock of the rod 320 against it which takes place when the mechanism is stopped and to silence the operation of the mechanism. A stud 330 which extends from the lower chassis member 100 supports the lever 324. The take-up idler pulley 326 is supported by a floating link 332 connected to the lever 324. This lever 332 is spring biased to the left by means of a spring 334. Accordingly, the rod connecting link 320 normally keeps the idler roller 322 in decoupled position when the recording and reproducing apparatus is idle or stopped. The bow lever 294 and the tension responsive mechanism are maintained in the position shown when the lever is idle or stopped by means of a spring 336 connected to the end of a finger 338 on the pin carrying arm 290.

The bow lever 294 will be pivoted in a clockwise direction when the play/record button 40 is depressed. The lever 294 engages the finger 298 of the pin carrying arm 290 and carries the arm 290 to the left until the surface of the finger 298 strikes a stop 340. This stop 340 is mounted on a bracket 342. The stop is a screw which is threaded into the bracket 342. A spring 344 around the screw locks the adjustment. This stop adjusts the overtravel of the toggle joint defined by the lever 294 and the link 302 which will be explained hereinafter. The pin 86 will therefore be carried over to the left into engagement with the tape.

The link 302 is a toggle link which moves from the position thereof shown in FIG. 2 to the position shown in FIG. 8 when the pushbutton 40 is pressed. In the idle or stop position shown in FIG. 2, the knee of the toggle joint defined between the link 302 and the lower arm of the lever 294 is bent. The force applied upon pressing the pushbutton 40 is transferred to the toggle joint by way of the link 318 and causes the knee of the toggle joint to straighten and then travel through the straightened position over a predetermined distance. The amount of this overtravel is determined by the setting of the stop 340, since this stop 340 engages the upper end of the bow lever 294 through the finger 298. When the knee of the toggle joint is straightened, the link 302 and the lower arm of the bow lever 294 are in line with each other. It will be observed that the springs 336, 154 and 311 all tend to keep the knee of the toggle joint bent in the position shown in FIG. 2 where the mechanism is in idle or stop condtion. The knee of the joint, however, travels through the straightened position thereof and therefore cannot be returned to the bent position shown in FIG. 2 by the forces applied through the springs 154, 311 and 336 alone. It is a well-known property of a toggle joint that the force required to straighten the joint increases greatly as the joint approaches straightened position. Thus, when the joint is straightened by the force manually applied by pressing the pushbutton 40 thereby overcoming the spring forces, a force greater than a spring force is necessary to return the toggle joint to the bent knee position shown in FIG. 2. In other words, the toggle joint serves as a detent or locking mechanism after it travels through the straightened knee position.

The toggle joint pivots the pressure roller arm 304 in a counter clockwise sense when the joint is straightened. The pressure roller 66 is therefore pressed against the capstan 64 and the pushbutton 40 is maintained in down position. The toggle joint therefore functions as a detent in locking the pressure roller 66 and pushbutton 40 in position for driving the tape at normal reeling speed. The rod 320 is also advanced to the right and releases the lever 324 and associated link 332 which carries the idler roller 326. The idler roller 326 therefore moves under the bias of the spring 324 into contact with the take-up pulley 342 and the boss 276 on the capstan flywheel.

The amount of force necessary to return the toggle to the bent knee position shown in FIG. 2 through the straightened knee position is determined by the amount of overtravel of the toggle beyond the straightened knee position, since the amount of force necessary to pivot a toggle joint is determined by the angle between the toggle bars. This amount of overtravel is adjustable with the adjustable stop 340. The stop is adjusted so as to cause the toggle joint to overtravel by a distance which would necessitate an amount of force to return the toggle joint which would be greater than the forces applied through the springs 336, 154 and 354, and the forces applied to the joint by the tape 22 as it bears against the pin 86 during normal reeling operations.

When the end of the tape is reached and the tape is almost exhausted on the supply hub 24, the tension exerted by the tape on the pin 86 increases greatly and a considerable force is developed which tends to pivot the link 290 toward the right. This force is transferred to the bow lever 294. The stop 340 is adjusted so that the force of the tape against the pin when the end of the tape is reached is the minimum force necessary to return to the toggle joint to the bent knee position shown in FIG. 2. When such minimum force is reached, the toggle joint will snap quickly into its initial position because the springs 154, 311 and 336 provide sufficient bias to rapidly return the toggle joint to bent knee position immediately after the knee is straightened. There is, therefore, provided a snap toggle tension responsive mechanism which is operative during normal reeling operations and functions as a detent to maintain the driving elements and control responsive elements of the recording and reproducing apparatus in operating position during normal reeling operations but instantaneously restores the mechanism to idle and stop conditions when the end of the tape is reached so that a predetermined minimum amount of tension is developed and applied to the mechanism.

When the toggle mechanism snaps back to initial bent knee position, the pressure roller 66 pivots away from the capstan 64, the idler roller 326 is taken out of contact with the boss 276 and the take-up pulley 242, the brake shoes 176 are applied and the motor control switch 106 is released so that the motor coasts to a stop. Thus, driving couplings are disengaged, brakes are applied and the mechanism is stopped and restored to idle condition automatically just before the end of the tape is reached.

Figure 5:
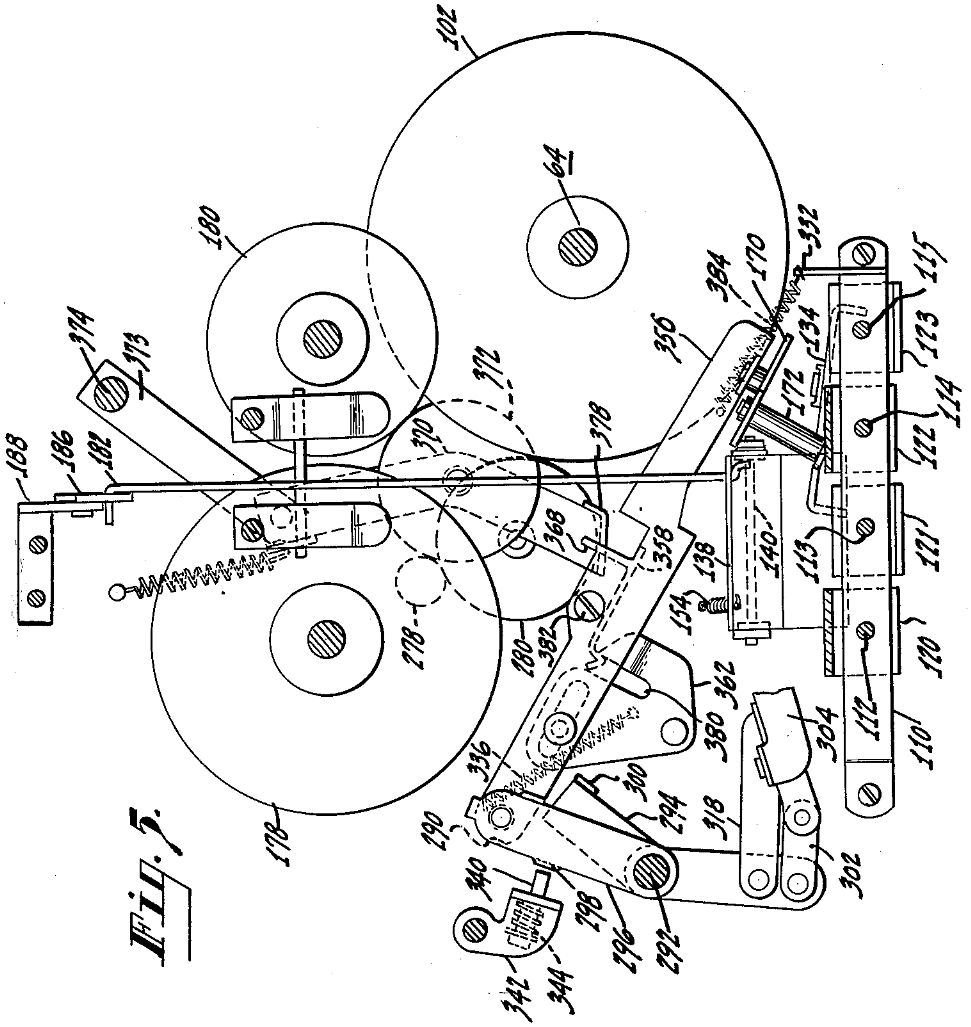
FIG. 5 is a top plan view similar to FIG. 2 showing certain parts of the mechanism conditioned for fast forward tape reeling.

A similar automatic operation is obtained for the fast forward condition of operation by another detent mechanism which is best shown in FIGS. 2 and 5 of the drawings. This mechanism also forms the subject matter of the aforesaid application filed concurrently herewith in the name of Philip J. O'Connell.

This mechanism provides the advantage of occupying somewhat less space than the toggle detent mechanism used during normal reeling operations of the apparatus. This fast forward tension responsive mechanism makes use of the arm 290 which carries the finger 298 against the stop 340, as was the case with the tension responsive mechanism operative during normal reeling. This mechanism also includes the arm 296 which is pivoted on the stud 292. The free end of this arm 296 is linked to a slide 356 which actuates the fast forward tension responsive mechanism. This slide 356 is linked to the fast forward bellcrank 170. The fast forward bellcrank 170 is pivoted in a counter-clockwise direction when the fast forward pushbutton 42 is depressed and moves the fast forward actuating slide 356 to the left. The fast forward actuating slide has a latching spring 358 attached thereto by means of a bracket 360. This latching spring is carried under the cam surface of a catch plate member 362. The catch plate member 362 is supported on a stud depending from the panel 32. A slot 364 in the member 362 receives a stud 366 on the slide 356 which defines the path of movement of the slide in cooperation with the bellcrank.

The fast forward actuating slide has a finger 368 which depends therefrom into engagement with the upturned end of a floating link 370 which is bow-shaped. This link 370 carries an idler roller 372 which couples the fast forward pulley 180 and the motor shaft 278 in driving relationship. The link 370 is linked to an arm 373. This arm 373 is pivotally mounted on a stud 374 which depends from the panel 32. A spring 376 tends to pull the arm 372 into contact with the shaft 278 and the pulley 180. This movement is counteracted by the finger 368 on the slide 366 during all conditions of the apparatus except fast forward, since an inverted finger 378 on the link 370 engages the finger 368.

When the fast forward pushbutton 42 is depressed, the slide 356 moves to the left and the spring 358 cams over the leading edge of the catch plate member 362 and falls into a slot 380. The link 296 also moves to the left and carries the arm 290 and its pin 86 into contact with the stop 340. The brakes 176 are released upon pressing the pushbutton 42 in the manner described above. The pushbutton remains down when the plate member 362 and the spring 358 engage each other in latching relationship. The fast forward idler roller 370 also is permitted to move to a position whereat it frictionally couples the fast forward pulley 180 and the motor shaft 278 to each other. Thus, the tension responsive mechanism, through the actuating slide 356 thereof, conditions the recording and reproducing apparatus for fast forward operation.

The force applied by the spring 358 may be adjusted so that the minimum force required to overcome the force of the spring 358 will be about that due to the tension in the tape when the end of the tape on the supply hub is approached. This adjustment is made by means of a screw 382 having an eccentrically disposed head which is mounted on the slide 356. The periphery of this screw engages the spring so that turning the screw in one direction tends to pivot the spring downwardly in the direction of the slot 380 while turning the screw in the opposite direction permits the spring to rise somewhat out of the slot.

The tension in the tape applied through the pin 86 is sufficient to force the actuating slide 356 to the right thereby overcoming the tension of the spring 358. Once the tension in the spring 358 is overcome, the slide 356 will be brought quickly to the right under the bias of a spring 384 which is attached thereto, as well as the spring 154 which is coupled to the slide through the brake bellcrank lever 138, the knob bracket 122, and fast forward bellcrank 170. The spring 336 also tends to bias the slide to the right.

The driving force on the fast forward pulley 180 is released, since the fast forward idler pulley is moved out of engagement with the shaft 278 and the pulley 180 by the finger 368 in the slide 356. The brakes are simultaneously applied, since the pushbutton bracket 122 is restored to up position. Thus, the mechanism stops and returns to idle condition.

The structure and mode of operation of the apparatus for normal and fast forward reeling have been described above. The mechanism rewinding the tape on the supply hub will now be described having particular reference to FIGS. 2 and 14 of the drawings. The rewind mechanism is operated by pressing the rewind pushbutton 41. This pushbutton pivots the rewind bellcrank 164 and pulls the rewind connecting link 168 to the left. This rewind connecting link is linked to a control lever 386 which carries the rewind tension responsive spring 88. This control lever 386 is pivoted on the stud 348 which carries the hold-down member 74. It is noted that both the hold-down member 74 and the pressure roller arm 304 are biased by springs 350 and 311, respectively, which are anchored to the rewind connecting link 168. The part of the link 168 to which these springs are anchored does not move when the arm 304 and the member 74 are actuated. Similarly, when the link 168 moves, the arm 304 and the member 74 are stationary. Accordingly, spring anchorage is provided without interference among the arm 304, the link 168 and member 74.

The control lever 386 has a depending finger 388 which contacts an adjustable stop 390. The adjustable stop 390 is similar in construction to the adjustable stop 340.

A link 392 is connected to the end of the control lever 386. This link 392 and the control lever 386 define a toggle joint with the knee of the joint therebetween. The link 392 is connected to a bow lever 394 which causes the rewind pulley 178 to be actuated when the lever 394 is pivoted to a predetermined position. The lever 394 is pivotally mounted on a stud 396 depending from the panel 32. The outboard end of the lever 394, which is near the left edge of the panel, extends downwardly toward the lower chassis member 100. A U-shaped bracket 398 is attached to this outboard end of the bow lever 394. A spring 400 is attached to this outboard end of the lever 394 and tends to pivot the lever 394 in a clockwise direction. Accordingly, the edge of the bracket 398 engages an arm 402 which is pivotally mounted on a stud 404 extending from the lower chassis member 100. The movement of the arm 402 toward the rear of the machine is limited by a stop stud 406.

A floating link 408 is linked to the arm 402 and carries an idler roller 410 at the free end thereof. This idler roller couples the inner periphery of the outer rim of the supply pulley 178 to the motor shaft 278 when the mechanism is conditioned for fast rewind operation. A pair of springs 412 and 413 are connected from a post 414 on the panel 32 to different points on the floating link 408 so that the link 408 and the arm 402 are biased for rotation in a clockwise direction thereby uncoupling the rewind idler roller 410 from the pulley 178 and the shaft 278. Thus, during all conditions of operation of the mechanism except for rewind the idler roller 410 is decoupled from the pulley 178 and shaft 278 by the biasing action of the springs 412 and 413.

When the rewind pushbutton 40 is depressed, the control lever 386 is pivoted in a clockwise direction. Sufficient force is exerted upon pressing the button 41 to overcome the bias of the springs 400 and 154, to straighten the knee of the toggle joint defined by the link 392 and the lever 386 and to cause the joint to travel over its straightened position. The amount of this overtravel is adjusted by means of the adjustable stop 390 which abuts against the finger 388 on the lever 386. As explained in connection with the description of the normal reeling toggle mechanism, the amount of overtravel is adjusted in order to adjust the force necessary to restore the toggle to initial position shown in FIG. 2 to a certain minimum force which equals the force applied due to the tension of the tape when the tape approaches the end of the supply hub as it is being unreeled therefrom. Thus, the toggle joint functions as an adjustable detent to lock the apparatus in condition for rewind at a fast reverse speed.

It will be observed that the bow lever 394 will pivot in a counter clockwise sense about the stud 396. The edge of the U-shaped bracket 398 therefore moves away from the arm 402 and permits the link 408 and the arm to move under its spring bias and carry the rewind idler roller 410 into frictional coupling relationship between the outer rim of the pulley 178 and the motor shaft 278.

The motor 104 which drives the shaft 278 is energized since the motor control switch is actuated when the pushbutton 41 is down. The pushbutton 41 is retained in down position by the detent action of the toggle mechanism. The brakes are also released since the pushbutton 41 is in down position.

When the tape approaches the end thereof on the take-up hub 26 tension on the pin 88 increases so that the minimum amount of force necessary to bring the toggle to idle position is exerted. The lever 386 therefore pivots around the stud 348 in a counter clockwise direction and forces the knee of the toggle through straightened position. The toggle link 392 quickly snaps back to initial position under the bias applied by the spring 400 which is attached to the bow lever 394. The brakes 176 are therefore applied quickly and the motor 104 is de-energized so that the mechanism stops and is restored automatically to idle condition.

The tension responsive mechanisms which condition the apparatus for normal reeling, fast forward or rewind operation may be operated manually as well as automatically. This is accomplished by merely pressing the stop pushbutton 43. When this pushbutton is depressed, as explained heretofore, the levers 134 and 138 are pivoted. The lever 138 engages the lower end flange of the knob brackets 120, 121 and 122 and returns any one of these brackets and its associate pushbutton to up position. The force manually applied to the stop pushbutton 43 is also transferred through any one of the pushbuttons 40, 41 and 42 which happens to be down to the tension responsive mechanism associated therewith. Since this force is greater than the minimum force required to bring any of these tension responsive mechanisms to stop and idle position (shown in FIG. 2), any of the tension responsive mechanisms which happens to be set is released, as would be the case if the tension responsive mechanism operated automatically upon an increase in tension in the tape.

The driving systems for the capstan 64 and the hubs 24 and 26 were generally described in connection with the description of the tension responsive mechanisms. The following more comprehensive description of the hub and capstan driving systems in this illustrative embodiment of the invention should aid in a better understanding of the present invention.

FIG. 2 illustrates the capstan driving system as including the capstan flywheel 402, the capstan idler roller 280 and the motor drive shaft 278. The capstan idler roller is made of resilient material such as rubber, and is always biased into contact with the shaft 278 and the flywheel 102 by the spring 287. Thus, the capstan flywheel turns so long as the motor 104 is energized. The capstan will not drive the tape unless the pressure roller 66 presses the tape against the roughened surface of the capstan 64. Since the capstan is driven at the constant normal reeling speed for propelling the tape during recording and playback, the tape should be simultaneously reeled from the supply hub 24 to the take-up hub 26. Such reeling is accomplished by means of the boss 276 which depends from the capstan flywheel 102, the take-up idler 326 and the take-up pulley 242. The take-up pulley is disposed immediately below the fast forward pulley 180 on the shaft 226. The idler roller 326 is in the same plane as cooperating portions of the pulley 242 and the boss 276. The take-up idler roller 326 may be made of some resilient material such as rubber. The roller 326 is controlled and permitted to frictionally contact the pulley 242 and the boss 276 only when the play-record button 40 is pressed by means of the normal reeling, tension responsive toggle mechanism.

It will be noted that the take-up pulley 242 is driven through the take-up clutch 246 which permits only a predetermined amount of torque to be transmitted to the clutch. The speed ratio determined by the diameters of the boss 276 and the take-up pulley 242 is selected so that the take-up hub 26 would be rotated at a rotational speed greater than the rotational speed of the capstan. However, the pulley will turn freely on the shaft (its rotation being restricted only by friction in the clutch 246); when the torque exerted on the hub and on the shaft due to the back tension in the tape is exceeded. Therefore, the tape will be taken up on the hub as fast as it is propelled by the capstan without slack or waves in the tape. As was mentioned previously, the torque transferred to the hub through the clutch 246 cannot exceed the breaking or rupture strength of the tape.

The supply pulley 178 is not driven during normal reeling operations. This pulley is coupled to the supply hub 24 through the take-up clutch assembly. Thus, the take-up pulley will rotate freely on the shaft as the tape is pulled and rewound from the supply hub by the capstan. The take-up idler is controlled by the normal reeling toggle mechanism which is responsive to the tension in the tape and is placed into engagement for driving the take-up hub when the toggle mechanism is set in operative position by pressing the play/record button 40. The capstan 64 is also controlled by the tension responsive mechanism since the switch 106 which controls the motor for driving the capstan is actuated to energize the motor only while the tension responsive mechanism is set.

After a period of normal reeling when the brakes are applied, either automatically through the tension responsive mechanism or manually by pressing the stop button 43, braking forces are applied to the fast forward pulley 180 and the supply hub drive pulley 178. Braking force applied to the hubs is limited by the clutch assemblies. Thus, the hubs are effectively disconnected from the heavy rotating elements such as the capstan flywheel 10 and the motor 104. Accordingly, the braking force applied to the hubs through the clutch will not exceed the rupture strength of the tape. The brakes, however, are sufficiently strong to stop these heavy rotating elements within a short period of time.

In fast forward operation, the take-up idler roller 326 is released. The capstan is driven. However, since the pressure roller 66 is not brought into contact with the capstan 64 during fast forward operations, the capstan 64 is not operative to propel the tape. The tape merely slides over the capstan as it is reeled at high speed on the take-up hub 26. The fast forward idler roller 372 is released by the fast forward tension responsive mechanism which includes the spring 358 so as to frictionally couple the fast forward pulley 180 to the motor shaft 278. It may be desirable to place a motor pulley on the motor shaft 278. This pulley will be made of some resilient material such as rubber to provide greater frictional coupling between the motor pulley and the idler pulleys 280, 372 and 410 which are disposed for contact therewith.

The fast forward idler pulley 372 may be a roller of resilient material such as rubber as was the case for the other idler pulleys 326 and 280. When the idler pulley 372 is disposed in frictional coupling relationship with the shaft 278 and the pulley 180, the fast forward pulley 180 is driven at high speed. The take-up turntable 224 is driven through the turntable shaft 228 at high speed. The amount of torque transferred to the turntable shaft 226 is restricted by the friction of the fast forward clutch assembly. The amount of torque transferred to the take-up hub is sufficient to drive the hub at the high speed determined by the relative diameter of the motor shaft 278, fast forward pulley 180 and the idler roller 372. The supply hub 24 is rotated as the tape is pulled from the supply hub by the take-up hub 24. The supply pulley 178 rotates freely on the supply turntable shaft 194, the rotation thereof being restricted only by clutch friction.

It will be appreciated that the rapidly rotating motor 104 and the other heavy rotating elements develop a large amount of inertia as they rotate during fast reeling operations. Such inertia is disconnected from the tape during stopping by means of the clutch assemblies on the turntable shafts. The fast forward clutch on the upper part of the take-up turntable shaft 226 limits the torque applied to the take-up hub to a relatively small amount (for example, 14 inch ounces). This torque produces insufficient force on the tape at the outer diameter of the tape, as it is reeled on the hub, to exceed the breaking strength of the tape. Thus, the rapid automatic stopping of the tape by the tension responsive mechanism may be achieved without the possibility of breaking the tape.

Again it will be observed that the tension responsive mechanism controls the fast forward driving system by controlling the movement of the fast forward idler roller 372 and also the rotation of the motor shaft 278 by controlling the energization of the motor 104.

The rewind driving system includes a supply pulley 178 which is driven by the motor shaft 278 through the supply pulley 178. The supply pulley 178 is rotated in the reverse direction to wind tape thereon since it is driven through the idler pulley 110 on the inside periphery of the outer rim thereof. The supply pulley 178 is coupled to the supply hub turntable shaft 194 through the clutch mechanism including the clutch band 204. Thus, the amount of torque applied to the shaft 194 is limited. The capstan 64 is rotated through the idler pulley 280, but the capstan does not interfere with the rewinding of the tape since the pressure roller 66 does not pinch the tape against the capstan. Thus, the tape merely slides over the capstan 64 as it is reeled at high speed onto the supply hub 24.

During braking, the rupture strength of the tape is not exceeded because of the clutch on the shaft 194 which effectively disconnects the drive motor 104 and other heavy rotating parts from the supply turntable shaft 194 during braking in the manner heretofore described.

Again the rewind tension responsive toggle mechanism controls the rewind drive system through the bow lever 394 thereof. The motor control switch 106 is also actuated or deactuated depending upon whether the rewind toggle mechanism is set or reset back to idle position.

FIGS. 15 and 16 show an expansion linkage which is suitable for use in place of the L-shaped linkage 318. This linkage may be connected, as was the linkage 318, between the bellcrank 160 and the bow lever 294. The linkage shown in FIGS. 15 and 16 comprises three links 450, 452 and 454. The link 454 has a finger 457 extending therefrom. A spring 456 is connected between the end of this finger of the link 454 and a stud on which the links 452 and 450 are pivotally mounted. This spring 456 tends to maintain the linkage in closed position as shown in FIG. 15. A certain amount of force must be exerted on the pushbutton 40 in order to overcome the spring bias and expand the linkage to the position shown in FIG. 16. The center link 452 has a limited amount of travel determined by the stop 458 on the linkage 454 which engages a stepped end portion 460 on the center link 452. Thus, the expanded length of the linkage is limited to a distance determined by the length of the center link 452 and the position of the stop 458. This length is related to the distance over which the play/record pushbutton 40 may travel before the end flange of the bracket thereon will stop upon reaching the interlock slide in the pushbutton assembly. The full expanded length of the linkage is not attained, even though the pushbutton 40 is fully depressed.

The expansion linkage shown in FIGS. 15 and 16 provides a safety device to prevent breaking the tape by inadvertent operation of the play/record pushbutton after the tape has become exhausted on the supply hub 24 and before the cartridge is turned over. It will be appreciated that the tape is tightly stretched over the pin 86 after it has reached its end on the supply hub. The pin 86 will be disposed to the right since the normal reeling tension responsive mechanism will have been actuated upon reaching the end of tape on the supply reel. Thus, if the pin 86 were forced to the left against the tightly stretched tape, by inadvertence in applying abnormal force on the play/record button, the tape might be pulled off the supply hub or ruptured. The expansion linkage shown in FIGS. 15 and 16 precludes breakage of the tape by expanding upon inadvertent operation of the play/record pushbutton 40, instead of transferring force which might otherwise break the tape.

Two mechanisms which are useful for effectively disconnecting either of the supply or take-up hubs of the apparatus shown in FIGS. 1, 11 and 14 when the end of the tape is reached so as to prevent breaking of the tape are shown in FIGS. 12 and 13. Such mechanisms may be used as an alternative to the clutch mechanism shown particularly in the preferred embodiment of the invention shown in FIGS. 9, 10, 11 and 11*a*. The mechanisms illustrated in FIGS. 9, 10, 11 and 11*a*, as well as in FIGS. 12 and 13, while especially suitable for use in magnetic recording and reproducing apparatus, may be used in other reeling systems and in any system where a rotating load is to be disconnected from a rotating driving system. Thus, these mechanisms may, for example, be used in motor drive systems of various types. Whereever parts shown in FIGS. 12 and 13 are similar to those shown in the other figures of the drawing similar reference numerals will be used.

Referring, now, more particularly to FIG. 12, a pulley 416 is shown mounted for rotation on a shaft 418. This shaft may be used to mount one turntable for rotating a hub such as the hubs 24 or 26 illustrated in FIG. 1. A pulley 278–1, mounted on a shaft 278–*a*, is adapted to be driven by a drive motor such as the motor 104 shown in FIG. 3. An idler roller 420 of soft resilient material, such as compliant rubber, is mounted on a link 422. This link may be a floating link such as supports any of the idler rollers shown in FIG. 2. The center of the motor pulley 278–1, idler roller 420 and hub drive pulley 416 have a predetermined positional relationship with respect to each other such that the angle subtended by lines 424 and 425 drawn between the centers of the pulley 278–1 and the idler 420 and the center of the idler 420 and the pulley 416 is slightly less than 180 degrees. This angle may be referred to as a "snubbing" angle.

The motor pulley 278–1 may be assumed to be rotating in a counter-clockwise sense so that the idler roller 420 will be rotating in a clockwise sense and the pulley 416 will be rotating in a counter-clockwise sense. A spring 426 holds the idler roller 420 in frictional contact with the pulley 278–1 and 416. In addition, the roller 420 is maintained between and in frictional contact with the pulleys 278–1 and 416 by the regenerative driving forces applied to the roller 420 by the pulleys 278–1 and 416 as these pulleys rotate. This will be seen to be the case because the tangential forces applied by pulley 278–1 tends to hold the roller 420 against the hub drive pulley 416.

The mechanism functions as a mechanical fuse or overload release when the load on the hub drive pulley 416 increases. This may be caused in a magnetic tape reeling system when the tape reaches the end thereof which is wound on the hub driven by the pulley 416. The pulley 416 then slows down and effectively applies a braking force to the roller 420, since the roller 420 tends to rotate at a fast speed determined by the speed of the motor pulley 278–1. When a certain predetermined load is exceeded, the load being determined by the snubbing angle, the rubber idler 420 compresses and tends to travel past the position of a line drawn between the centers of the pulleys 278–1 and 416. When the roller 420 moves past center, the driving forces thereon become degenerative. In other words, the motor pulley 278–1 tends to throw the roller 420 outwardly of the line drawn between the centers of the pulley 278–1 and the hub drive pulley 416. The spring 426 keeps the roller out of intermittent driving relationship with the pulleys 278–1 and 416. This releases the load from the driving forces instantly. To resume reeling operations the idler roller 420 is returned to its original position. This may be accomplished manually by a linkage between the function selection pushbuttons and the link 422.

Referring, more particularly, to FIG. 13, a hub driving pulley 428 is shown which is illustrated as being of the type adapted to drive the supply hub in the recorder illustrated in the preceding figures and FIG. 14. A shaft 430, with which the hub driving pulley 428 rotates, may support a hub driving turntable similar to the turntable 190 shown in FIG. 9. A motor pulley 278—2 which is adapted to be driven by the shaft of a motor 278–*b* is the primary driving means. This pulley 278–*b* may be coupled to the inner rim of the hub drive pulley 428 by means of an idler roller 410—2. This idler roller 410—2 is carried by a floating link 408—2. The floating link 408—2 is carried on the end of a pivotal arm 402—2. This arm is biased out of driving relationship with the pulleys 428 and 278—2 by means of a spring 432. A bow lever 394—2 and toggle joint defined by the lever 386—2 and 392—2 is associated with the bow lever 394—2. A spring 434 extends from the end of the bow lever 394—2 to the arm 402—2 and biases the idler roller 410—2 into frictional coupling relationship with the motor pulley 278—2 and the hub drive pulley 428. A stop in the form of a post 436 is used to limit the movement of the idler roller 410—2 so that the idler pulley and arm remain in a location such that the idler roller cannot touch the hub drive pulley 428 when the idler roller is released in a manner to be described hereinafter.

The idler roller is released by a release mechanism comprising a bellcrank 438 pivoted on a stud 440. A pivot, brake pad 442 is mounted on one end of the bellcrank 438. The bellcrank is biased by a spring 444 to tend to bring the pad 442 into contact with the idler roller 410 at a predetermined position thereon which is between a line drawn from the center of the pulley 428 to the center of the idler 410 and another line drawn from the center of the idler 410 to the center of the motor shaft 278–*b*. This bias is counteracted by a stronger spring 446 which couples the bellcrank to the end of the bow arm 394—2.

Assuming the motor pulley 278—2 rotates in a counterclockwise sense and the toggle mechanism is set by a mechanism similar to that shown in the preceding figures, the idler roller 410—2 is therefore urged by force applied through the bow lever 394—2 and the spring 434 into frictional coupling relationship with the motor pulley 278—2 and the inner rim of the hub drive pulley 428. The bellcrank 438 is also biased away from the roller 410 by means of the spring 446 on the lever arm 394—2. When the toggle mechanism is reset, for example, in response to an increase in tension of the tape, the bellcrank 438 is released, as is the arm 402—2 holding the roller 410—2 in frictional coupling relationship with the pulleys 428 and 278–*b*. The pad 442 contacts the roller 410—2 and exerts pressure at a point thereon. The forces applied to the idler 410—2 by the motor pulley 278–*b* and the reaction force on the idler due to the hub drive pulley 428 (which is in part due to the inertia of the systems coupled thereto) causes the idler roller 410—2 to pivot about the point of contact of the pad 442 on the idler 410—2. The idler is then instantaneously moved or kicked out of its frictional coupling relationship between the pulleys. Thus, the pulleys are disconnected from each other. The largest amount of inertia developed in the system would ordinarily be due to the heavy motor armature. This inertia is therefore disconnected from the hub drive pulley and therefore from the tape.

From the foregoing description, it will be apparent that I have provided an improved magnetic recording and reproducing apparatus which is especially suitable for handling magnetic tape records carried in cartridges. It will also be apparent that many of the features of the magnetic recording and reproducing apparatus which I have provided may also be incorporated in reeling systems, motor drive systems and the like to obtain the advantages of low-cost, ease of manufacture, foolproof operation, and tape rupture prevention. While I have shown a magnetic recording and reproducing apparatus according to one form of my invention, as well as different embodiments of a subcombination thereof, various components and elements useful therein, as well as variations in the mechanisms themselves, all coming within the spirit of the invention will, no doubt, readily suggest themselves to those skilled in the art. Hence, I desire that the foregoing be considered as illustrative and not in any limiting sense.

What is claimed is:

1. Apparatus for transporting a reelable record medium comprising a drive for moving said medium, an actuable control for operating said drive, means for linking said control to said drive operable to retain said drive in operating condition when said control is actuated, and means coupled to said linking means and responsive to the tension in said medium for operating said linking means to release said drive from operating condition when said tension exceeds a predetermined amount.

2. Apparatus for handling a magnetic tape medium comprising control means adapted for manual actuation, means operable for driving said medium between said reels, means linking said control means to said driving means for operating said driving means and retaining said driving means in operating condition when said control means is actuated, and means coupled to said linking means and responsive to the approach of the end of the said tape on the one of said reels which is supplying said tape for releasing said linking means from retaining said driving means in said operating condition.

3. Apparatus for transporting an elongated medium which comprises means operable for driving said medium, said medium exerting a variable load upon said driving means, control means for operating said driving means when actuated, and means for linking said control means to said driving means for retaining said driving means in medium driving condition when said control means is actuated and responsive to said load for releasing said driving means from said medium driving condition when said load exceeds a predetermined load.

4. Apparatus for driving an elongated medium along a path which comprises means providing a source of power for driving said medium, a roller movable into driving relationship with said source and said medium, and means for moving said roller into driving relationship with said source and engageable with said medium for removing said roller from said driving relationship in response to tension in said medium.

5. In a tape transport mechanism for handling a tape, said mechanism having driving means movable into and out of operating position, the improvement comprising a mechanism for conditioning said transport mechanism for operation comprising an actuable control element, a drive member, a pair of links for coupling said element to said drive member, each of said links being interlinked with each other at an end thereof to define a movable toggle joint, and an element engageable with said tape and coupled to one of said pair of links for operating said joint.

6. In a tape transport mechanism having a pair of reel drive shafts each adapted to separately rotate different ones of a pair of reels between which a tap is adapted to be reeled, a rotatable member for driving at least one of said shafts when said rotatable member is moved into operating position, a pair of links for defining a toggle joint which moves and retains said rotatable member in operating position when said joint is set, said links defining a toggle joint, and an element coupled to one of said links and engageable with said tape for releasing said joint in response to a predetermined amount of tension in said tape.

7. Apparatus for transporting an elongated medium between a pair of hubs contained with said medium in a cartridge which comprises a plurality of selectively operable control members, a plurality of linkage mechanisms, each of said mechanisms being coupled for movement into and out of operating relation with a different one of said control members, separate detents associated with each of said mechanisms adapted to be set to retain in said operating relation any of said mechanisms moved into said operating relation by the operation of one of said control members, a plurality of rotatable members for driving said medium including rollers individually movable with different ones of said linkage mechanisms into position for driving said medium when said mechanisms are moved into said operating relation, and means included in said linkage mechanisms for sensing the amount of said medium on said hubs for resetting said linkage mechanisms out of operating position when said medium approaches the end thereof and is almost depleted on one of said hubs.

8. A magnetic tape transport mechanism for reeling magnetic tape to and from a pair of reeling devices which comprises separate means each for driving a different one of said reeling devices, said driving means each including a different movable drive coupling device, means responsive to the tension in said tape disposed between said reeling devices, a plurality of control members for conditioning said transport mechanism for different reeling operations, and a plurality of linkages each coupling a different one of said control members to said tension responsive means and to separate ones of said coupling devices, one of said linkages including a pair of toggle links, and said toggle links being selectively set in locking position upon actuation of a selected one of said control members and being released from locking position in response to excess tension in said tape.

9. A magnetic tape transport mechanism for handling tape records carried in cartridges having a pair of rotatable hubs around which said tape is wound which comprises a pair of turntables for receiving and driving said hubs to reel said tape along a path therebetween, a capstan, a pressure roller, an arm carrying said pressure roller mounted for pivotal movement to bring said pressure roller against said capstan for engaging said tape therebetween, a shaft adapted to be driven at constant speed, a drive system for coupling said shaft to said turntables and said capstan including a plurality of coupling rollers selectively movable for driving one of said turntables at a time, tape tension responsive members each disposed to engage tape adjacent a different one of said hubs, a plurality of control members for selecting different reeling functions, a plurality of linkages movable into operating position for separately coupling said control members to said pressure roller arm and for selectively moving said pressure roller arm and said coupling rollers to condition said transport mechanism for the selected one of said reeling functions, a plurality of detent mechanisms adapted to be locked when disposed in operating position associated separately with individual ones of said linkages for locking a selected one of said linkages in operating position, and means coupling said detent mechanisms to said tape tension responsive members to position said members in tape tension responsive position when their respective said detent mechanisms are locked in operating position, at least two of said detent mechanisms including toggle joints.

10. A magnetic tape transport mechanism for reeling tape records between a pair of reeling devices around which said tape is wound which comprises a pair of turntables for receiving and driving said reeling devices to reel said tape along a path between said devices, a drive system including a movable coupling roller for driving one of said turntables, a control member, a tape tension responsive element disposed between said turntables along said path, a linkage operated by said control member for moving said coupling roller into driving relationship in said drive system, said linkage including a pair of links defining a toggle joint, one of said pair of links carrying said element, means biasing said pair of links to maintain said toggle joint disposed on one side of dead center of said links when said coupling roller is out of driving relationship in said drive system, and a member coupling one of said pair of links to said control member for moving said joint to the opposite side of dead center of said links whereby to bring said element into contact with said tape, said joint returning to said first named side of dead center in response to tape tension greater than a predetermined amount.

11. The invention as set forth in claim 10 including a stop for limiting the movement of said pair of links to said opposite side of dead center for setting the amount of tension in said tape needed to return said toggle joint to said first-named side of dead center.

12. A magnetic tape transport mechanism for handling a magnetic tape carried in a cartridge and wound therein on a pair of rotatable hubs disposed in said cartridge, which mechanism comprises a pair of shafts for rotating said hubs, a capstan for driving said tape along a path between said hubs, a pressure roller disposed on the side of said tape opposite from said capstan for pressing said tape against said capstan, an arm carrying said pressure roller, means for biasing said arm for movement in a direction away from said capstan, a control member, a driving system for driving said capstan, a coupling roller for coupling one of said shafts for rotation with said capstan, a tape tension responsive element disposed adjacent said tape path, and linkage means coupling said control member to said roller, to said pressure roller arm and to said element for moving said coupling roller and said arm, said linkage means including a pair of links each linked to the other at one end thereof to define a toggle joint, the opposite end of one of said pairs of links being linked to said pressure roller arm, the opposite end of the other of said pair of links being coupled to said element, said biasing means maintaining said joint disposed to one side of dead center of said links, said control member setting said toggle joint on the opposite side of dead center of said links when actuated, and said element resetting said joint to said one side of dead center in response to the tension in said tape when said tension exceeds a predetermined magnitude.

13. A magnetic tape transport mechanism for handling magnetic tape carried in a cartridge and wound therein on a pair of rotatable hubs, which mechanism comprises a deck panel, a pair of turntables on said panel for receiving and driving said hubs to reel said tape along a path therebetween, a capstan extending through said panel, a magnetic head mounted on said panel, a member carrying a pressure pad extending through said panel, a pressure roller, said capstan and pressure roller and said magnetic head and said pad being disposed along said tape path on opposite sides thereof, a member having a hook portion extending through said panel and movable into position adjacent said cartridge with said hook portion overhanging an edge of said cartridge to hold said cartridge on said panel, an arm carrying said pressure roller and having two parts mounted for pivotal motion about a common axis, one of said parts carrying said pressure roller at one end thereof, a spring yieldably coupling said other part to the opposite end of said one part, means for adjusting the force of said spring to adjust the pressure exerted by said pressure roller against said capstan, different projections extending from said pressure roller arm to engage said hook and said pressure pad carrying member for moving said pad against said head and said hook over said cartridge when said pressure roller arm pivots in a direction to bring said pressure roller against said capstan, a shaft, a motor for driving said shaft, a frictional drive system coupled to said shaft for effecting driving of said turntables and said capstan and including a plurality of movable coupling rollers for selectively driving (*a*) one of said turntables at relatively slow speed to reel said tape along said path in a forward direction, (*b*) said one turntable at relatively fast speed to reel said tape in a forward direction, and (*c*) the other of said turntables to reel said tape at relatively high speed in a reverse direction for rewinding said tape, a first pin extending through said panel and into said cartridge to a position adjacent said path of travel of said tape near one of said hubs, a second pin extending through said panel and into said cartridge to a position adjacent said path of travel of said tape near the other of said hubs, a plurality of control members for selecting slow reeling, fast forward reeling and rewinding, three linkages separately coupling said control members to said pressure roller arm and said drive system for selectively moving said coupling rollers and said pressure roller arm into and out of operating position to condition said transport mechanism for the selected one of said three reeling operations, each of said linkages including a detent mechanism for locking the selected one of said linkages in operating position, said detent mechanism in the one said linkages actuated by the one of said control members for selecting slow reeling including a pair of links each joined to the other at one end thereof to define a toggle joint, the opposite end of one of said pair of links being linked to said pressure roller arm, the opposite end of the other of said pair of links being coupled to one of said pins, means for biasing said pressure roller arm to normally maintain said toggle joint on one side of dead center of said links, means linking the one of said control members controlling slow reeling to said one of said pair of links to move said joint to the opposite side of dead center of said links so as to bring said one pin against said tape for sensing the tension therein and for pivoting said pressure roller arm to bring said pressure roller against said capstan, a stop disposed adjacent one of said pair of links for limiting the travel of said joint on said opposite side of dead center position, thereby setting the amount of force needed to return said toggle joint to said one side of dead center, said joint being returned to said one side of dead center by force exerted against said pin due to tension in said tape when said tape tension exceeds a predetermined amount, said detent mechanism in the one of said linkages operated by one of said control members for selecting rewinding including another pair of links defining another toggle joint, one of said other pair of links carrying said other pin, means biasing said other pair of links to maintain said toggle joint on one side of dead center of said last named links, a member coupling one of said other pair of links to said rewind control member for moving said joint to the opposite side of dead center of said other pair of links whereby to position said other pin in contact with said tape, said other joint being returned to said first named side of dead center of said last named links in response to force due to tape tension, and a stop for limiting the movement of said other pair of links to said last named opposite side of dead center for setting the amount of force needed to return said other toggle joint.

14. A magnetic tape transport mechanism for handling a magnetic tape which mechanism comprises a capstan for driving said tape along a path, a pressure roller disposed adjacent said capstan on the side of said path opposite from said capstan, an arm carrying said pressure roller and having two parts mounted for pivotal movement about a common axis, one of said parts carrying said pressure roller at one end thereof, a spring yieldably coupling said other part to the opposite end of said one part, and means for adjusting the force exerted by said spring between said parts to adjust the pressure exerted by said pressure roller against said capstan when said pressure roller pivots about an axis to bring said pressure roller against said capstan.

15. A magnetic tape transport mechnism for reeling a magnetic tape record carried on reeling devices along a path which comprises a capstan and a magnetic head disposed along said tape path on one side thereof, a pressure pad, a pivotal mounting member carrying said pad and disposed with said pad on the opposite side of said tape path from said head, a pressure roller, an arm carrying said pressure roller, said pressure roller being disposed adjacent said pressure pad on said opposite side of said tape path, a member having a retaining portion movable into position for holding down said reeling devices, and different projections extending from said pressure roller arm to engage said retaining member and said mounting member for moving said pad against said head and said retaining portion over said reeling devices when said pressure roller arm moves in a direction to bring said pressure roller against said capstan.

16. In a reeling system for driving a reel around which tape is wound, a turntable for turning said reel, a shaft on which said turntable is mounted, a pulley for turning said shaft, and means for limiting torque transfer to said shaft which comprises a dog on said shaft and rotatable therewith, a band of resilient material directly coupled to said pulley, and adjustable clamp means around said band for engaging said band with adjustable pressure and for engaging said dog for transferring torque from said shaft to said pulley through said band.

17. Apparatus for reeling a tape record between a supply reel device and a take-up reel device wihch comprises a capstan for engaging and driving said tape, a wheel having steps of different diameters rotatable with said capstan, means for rotating said wheel, a roller movable into operating position for coupling said take-up reel device and one of said steps for rotation, a pressure roller disposed opposite to said capstan and movable into operating position against said capstan for engaging said tape between said capstan and said pressure roller, and an operable control movable into operating position for simultaneously causing said coupling roller and said pressure roller to move into operating position.

18. Apparatus for reeling a tape record between a supply reel device and a take-up reel device which comprises a motor, a shaft driven by said motor, a capstan over which said tape passes, a wheel having steps of different diameter rotatable with said capstan and coaxial therewith, a plurality of idler rollers, the axes of said rollers, shaft and capstan being parallel to each other, one of said rollers continuously coupling one of said steps and said shaft in driving relationship with each other, one of said idler rollers being movable in a direction perpendicular to said axes into operating position to couple said supply reel device to said motor shaft for rotation therewith, a pressure roller, means for mounting said pressure roller and for carrying said pressure roller toward said capstan to press said tape against said capstan, another of said idler rollers being movable in a direction perpendicular to said shaft into operating position to couple said take-up reel device to another one of said steps for rotation therewith, and selectively operable controls for said apparatus for moving said mounting means and said other idler roller respectively toward said capstan and into operating position.

19. Apparatus for reeling a tape record between a supply reel device and a take-up reel device which comprises a motor shaft, a capstan, a wheel having steps of different diameter rotatable with said capstan and coaxial therewith, a plurality of idler rollers, the axes of said rollers, said shaft and said capstan being parallel to each other, a first of said rollers continuously coupling said shaft and one of said steps in driving relationship with each other, a second of said idler rollers being movable in a direction perpendicular to said axes into operating position to couple said supply reel device to said motor shaft for rotation therewith, a third of said rollers being movable in a direction perpendicular to said axes into operating position to couple said take-up reel device and said shaft for rotation therewith, a fourth of said idler rollers being movable in a direction perpendicular to said shaft into operating position to couple said take-up reel device to another one of said steps for rotation therewith, and selectively operable controls for said apparatus for moving a selected one of said last three named rollers into operating position.

20. Apparatus for reeling a tape record between a pair of reeling devices which comprises a pair of pulleys for driving said devices each having a rim thereon, a driving shaft, one of said rims surrounding said shaft, a pair of coupling rollers, means for moving one of said rollers into operating position to couple said shaft and the inner periphery of said one rim in driving relationship with each other so as to rotate one of said reeling devices in one direction, means for moving the other of said rollers into operating position to couple said shaft to the outer periphery of said other rim for rotating the other of said reeling devices in a direction opposite to the direction of rotation of said one device, a selectively operable means for controlling said last two named means.

21. Apparatus for reeling a tape record between a pair of reeling devices which comprises a shaft adapted to be motor driven in one direction, a pulley for driving one of said devices and having a rim thereon, said driven shaft being disposed within the area circumscribed by said rim, another pulley having a rim for driving the other of said reeling devices, a pair of coupling rollers, an arm carrying one of said rollers biased for movement into operating position to couple said shaft and the inner periphery of said rim into driving relationship with said one roller for rotating said one reeling device in one direction, another arm carrying the other of said rollers biased for movement into operating position to couple said shaft to the outer periphery of said rim with said other roller for rotating said other reeling device in a direction opposite to the direction of rotation of said one device, and a pair of selectively operable controls for said apparatus each having means for engaging said arms and moving said arms against the bias thereof to decouple said rollers except when operated.

22. Apparatus for reeling a tape record between a pair of reeling devices at fast and slow speeds and in forward and reverse directions which comprises a pair of shafts for carrying said reeling devices, a driving pulley coupled to one of said shafts for rotation therewith, a pair of driving pulleys coupled to the other of said shafts for rotation therewith, said pulleys all being displaced from each other in a direction axially of said shafts, all of said pulleys having outer rims, a motor shaft spaced from one of said reeling device shafts a distance less than the radius of the one of said pulleys thereon, a flywheel, means for continuously coupling said flywheel to said motor shaft for rotation therewith, a plurality of idler rollers for frictionally coupling said pulleys to said motor shaft and said flywheel, a plurality of movable arms each carrying a different one of said idler rollers, one of said arms being biased to bring one of said idler rollers into frictional driving contact with one of said pair of pulleys at the outer periphery of said rims thereon and with said flywheel for slow speed reeling in said forward direction, another of said arms being biased to move the one of said idler rollers carried thereon into frictional driving contact with said motor shaft and the other of said pair of pulleys at the outer periphery of said rim thereof for fast speed reeling in said forward direction, still another of said arms being biased to move the one of said idler rollers carried thereon into frictional driving contact with said motor shaft and said driving pulley coupled to said other shaft at the inner periphery of the rim thereon for driving said one shaft, and a plurality of selectively operable control mechanisms each including means for moving a different one of said roller carrying arms against the force of the bias thereon to decouple said idler rollers carried on said arms from frictional driving contact with said pulleys, said de-coupling means being operative to release the ones of said arms associated therewith when the control associated therewith is operated.

23. Apparatus for handling an elongated medium comprising means for driving said medium, a plurality of means each operable when actuated for conditioning said driving means for driving said medium in any one of a plurality of different directions and at any one of a plurality of different speeds in any of said different directions, selectively operable means for actuating said plurality of conditioning means, and means responsive to the tension in said medium and associated with said conditioning means for releasing any of said conditioning means which is actuated when said tension increases above a predetermined amount.

24. Apparatus for transporting an elongated medium along a path therefore comprising a rotatable member adapted to drive said medium along said path, drive coupling means cooperable with said rotatable member, an actuable control, a linkage coupling said control to said coupling means and movable to position said coupling means into engagement with said rotatable member when said control is actuated, a detent engageable with said linkage when said linkage moves said coupling means into engagement with said rotatable member, and an element coupled to said linkage and engageable with said medium for releasing said linkage from said detent in response to a predetermined amount of tension in said medium.

25. In a tape transport mechanism wherein a tape record is adapted to be driven along a path, the combination comprising a capstan, a movable pressure roller for engaging said tape record against said capstan, an actuable control member, a pair of links coupled together to define a toggle joint, means coupling said pressure roller to said links, means coupling said control member to said links, said toggle joint being set and said pressure roller being moved into engagement with said tape against said capstan when said control member is actuated, and a pin disposed along said path and coupled to one of said links, said tape extending around said pin and transmitting forces through said pin to release said toggle joint in response to a predetermined amount of tension in said tape.

26. In a tape drive system, the combination comprising a rotatable drive member, a rotatable driven member spaced from said drive member, and a rotatable coupling member disposed between said driven member and said drive member and in contact therewith in such relation that a line between the center of said driven member and the center of said coupling member and another line between the center of said coupling member and the center of said drive member define a snubbing angle of slightly less than 180°, said coupling member being constituted at least in part of resilient, compressible material, said coupling member, when compressed, having a dimension smaller than the distance between said driven member and said drive member and being movable along a path between said drive member and said driven member when compressed..

27. In a tape drive system, the combination comprising a rotatable drive member, a rotatable driven member, a rotatable coupling member disposed between said drive member and said driven member and biased into coupling relationship therewith, and a kick-out member movable into contact with said coupling member at a predetermined contact point of said kick-out member with the periphery of said coupling member for disengaging said coupling member from said drive member and said driven member.

References Cited in the file of this patent

UNITED STATES PATENTS

| | | |
|---|---|---|
| 2,280,727 | Stechbart | Apr. 21, 1942 |
| 2,335,277 | Heller | Nov. 30, 1943 |
| 2,528,061 | Knapp | Oct. 31, 1950 |
| 2,675,973 | Reed et al. | Apr. 20, 1954 |
| 2,712,448 | Schroter | July 5, 1955 |
| 2,732,144 | Jones | Jan. 24, 1956 |
| 2,733,871 | Reinhold | Feb. 7, 1956 |
| 2,745,604 | Masterson | May 15, 1956 |
| 2,768,244 | Tiger | Oct. 23, 1956 |
| 2,782,263 | Hoehn et al. | Feb. 19, 1957 |
| 2,792,217 | Weidenhammer et al. | May 14, 1957 |
| 2,793,039 | Hironimus | May 21, 1957 |
| 2,819,940 | Sorrells | Jan. 14, 1958 |
| 2,828,961 | Rehklau | Apr. 1, 1958 |
| 2,833,538 | Namenyi-Katz | May 6, 1958 |
| 2,877,958 | Moore et al. | Mar. 17, 1959 |
| 2,896,945 | Waldman | July 28, 1959 |
| 2,898,409 | Tiger | Aug. 4, 1959 |
| 2,911,162 | Kyle | Nov. 3, 1959 |
| 2,920,148 | Munroe | Jan. 5, 1960 |
| 2,927,743 | Shatavsky | Mar. 8, 1960 |

FOREIGN PATENTS

| | | |
|---|---|---|
| 830,655 | Germany | Feb. 7, 1952 |